(12) United States Patent
Uchida

(10) Patent No.: US 12,399,818 B2
(45) Date of Patent: Aug. 26, 2025

(54) MEMORY SYSTEM

(71) Applicant: Kioxia Corporation, Tokyo (JP)

(72) Inventor: Daisuke Uchida, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/600,848

(22) Filed: Mar. 11, 2024

(65) Prior Publication Data

US 2024/0311292 A1 Sep. 19, 2024

(30) Foreign Application Priority Data

Mar. 15, 2023 (JP) ................................. 2023-041001

(51) Int. Cl.
*G06F 12/02* (2006.01)

(52) U.S. Cl.
CPC ............................... *G06F 12/0246* (2013.01)

(58) Field of Classification Search
None
See application file for complete search history.

(56) References Cited

U.S. PATENT DOCUMENTS

| | | | |
|---|---|---|---|
| 10,716,225 B1* | 7/2020 | So ............... | H05K 5/03 |
| 2016/0066300 A1* | 3/2016 | McCabe ............ | G06F 1/206 |
| | | | 370/329 |
| 2019/0138224 A1* | 5/2019 | Yang ............... | G06F 3/0614 |
| 2020/0159442 A1* | 5/2020 | Shida ............... | G06F 3/0659 |
| 2020/0293197 A1 | 9/2020 | Choi et al. | |
| 2020/0401326 A1 | 12/2020 | Fujimoto et al. | |
| 2021/0132817 A1* | 5/2021 | Bhat ............... | G06F 3/0658 |
| 2022/0188028 A1 | 6/2022 | Mesnier et al. | |
| 2024/0119021 A1* | 4/2024 | Omura .............. | G06F 13/382 |

* cited by examiner

*Primary Examiner* — Kevin Verbrugge
(74) *Attorney, Agent, or Firm* — Oblon, McClelland, Maier & Neustadt, L.L.P.

(57) ABSTRACT

According to one embodiment, a host interface circuit includes a physical layer that performs communication with a host, and a protocol control circuit that determines a transfer rate between the physical layer and the host. When a temperature detected by a temperature sensor becomes equal to or higher than a first temperature, the protocol control circuit changes the transfer rate from a first transfer rate to a second transfer rate. The protocol control circuit transitions to a first mode in which a change of the transfer rate based on a first request from the host is prohibited.

20 Claims, 12 Drawing Sheets

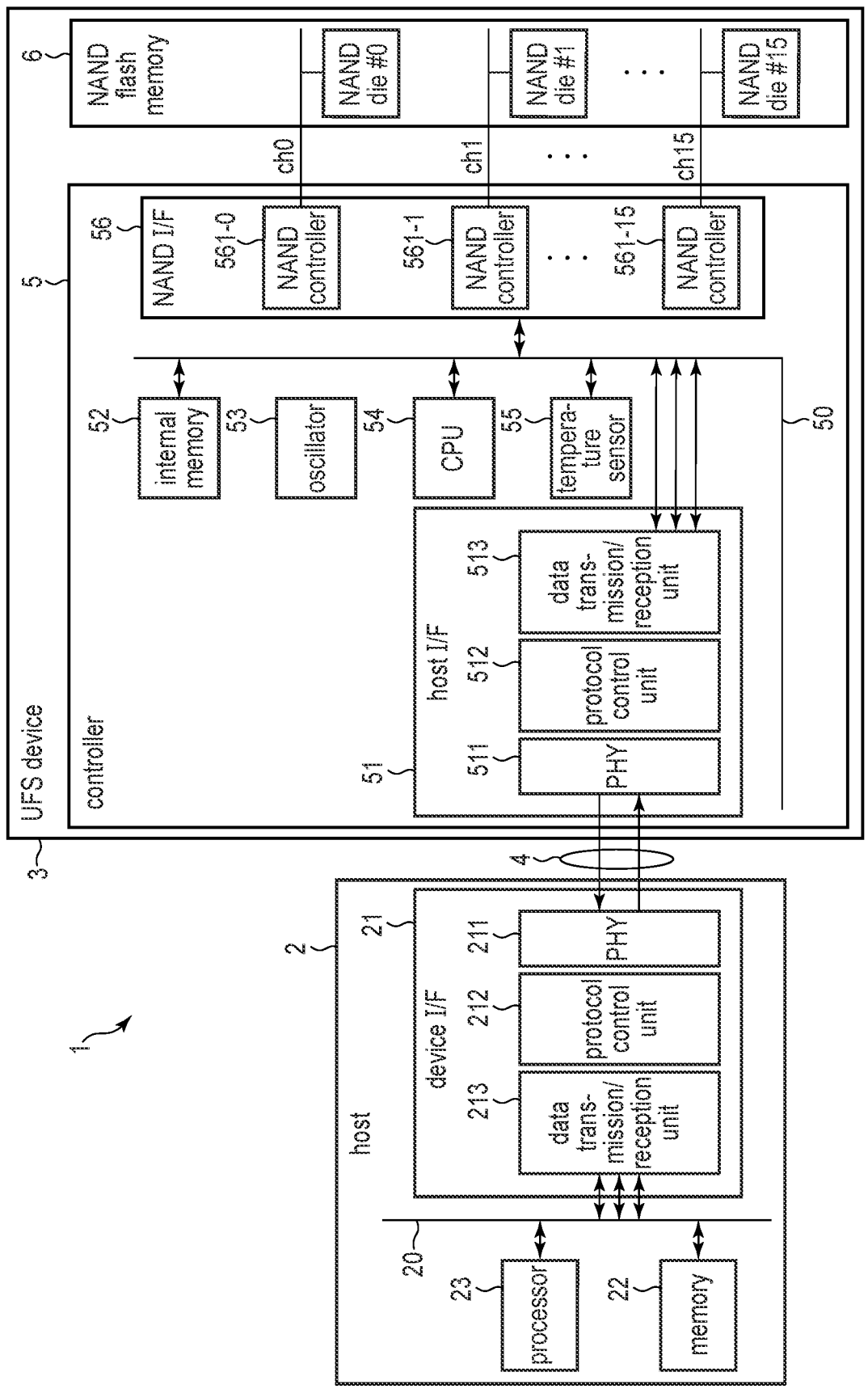
F I G. 1

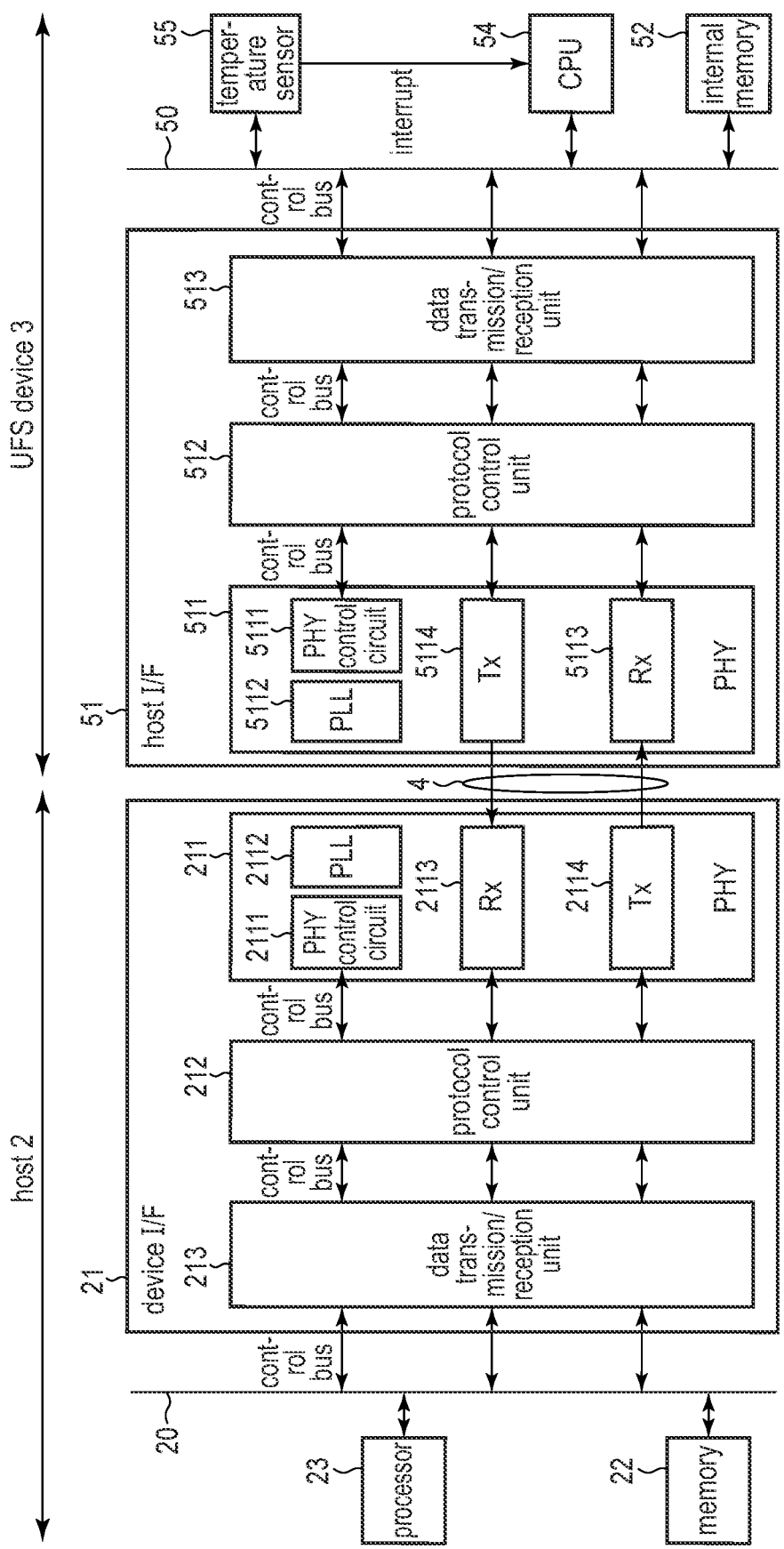
F I G. 2

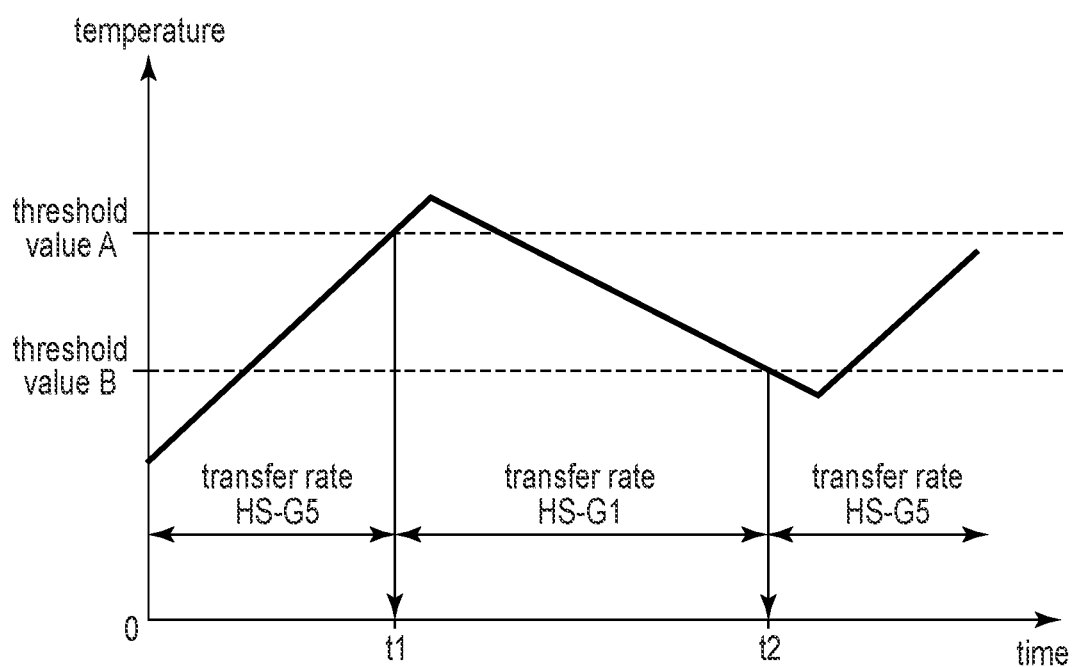
| HS-G | transfer rate | current value of the PHY | power consumption |
|---|---|---|---|
| HS-G1 | low | low | low |
| HS-G2 | ↕ | ↕ | ↕ |
| HS-G3 | | | |
| HS-G4 | | | |
| HS-G5 | high | high | high |
F I G. 3
F I G. 4

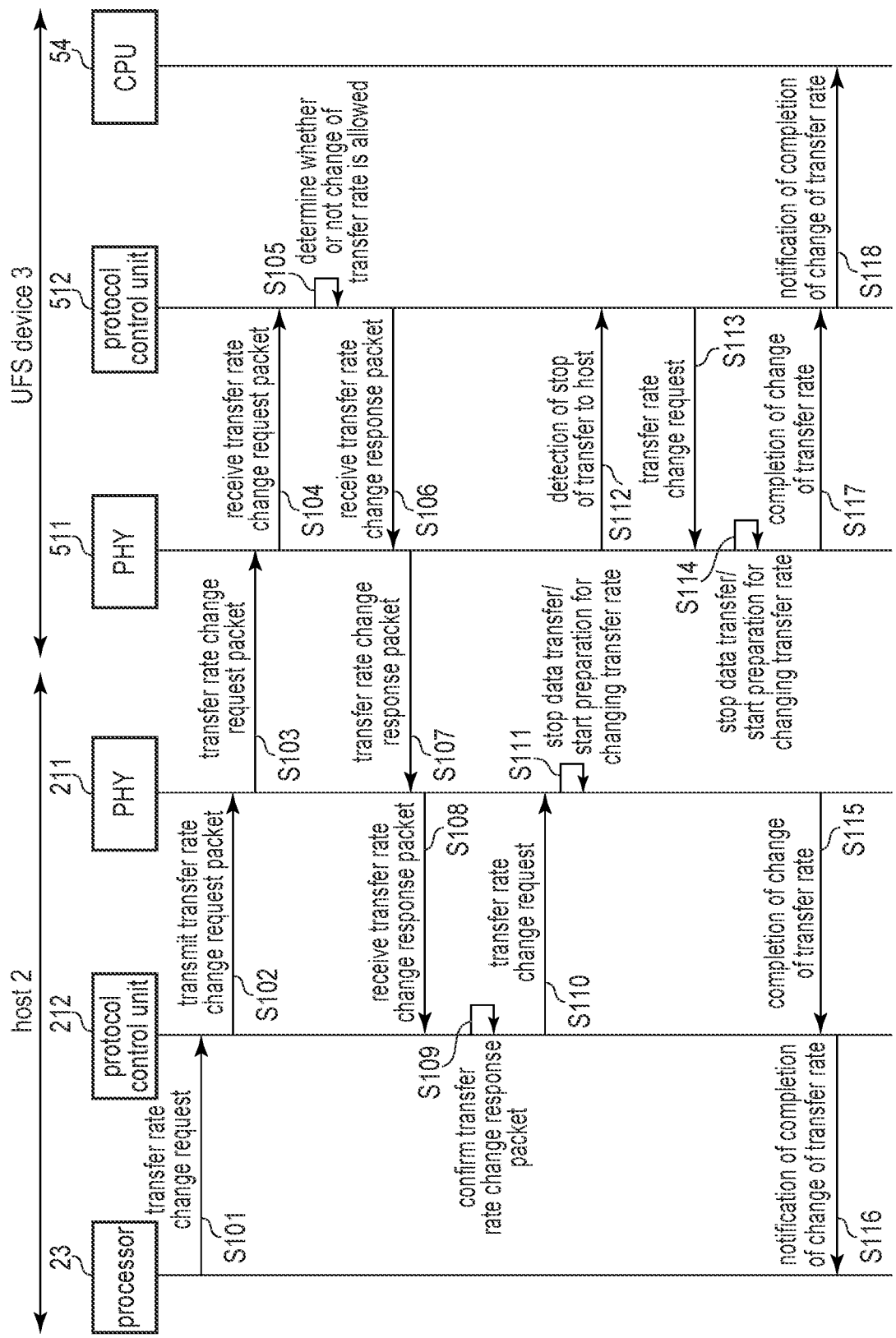
F I G. 5

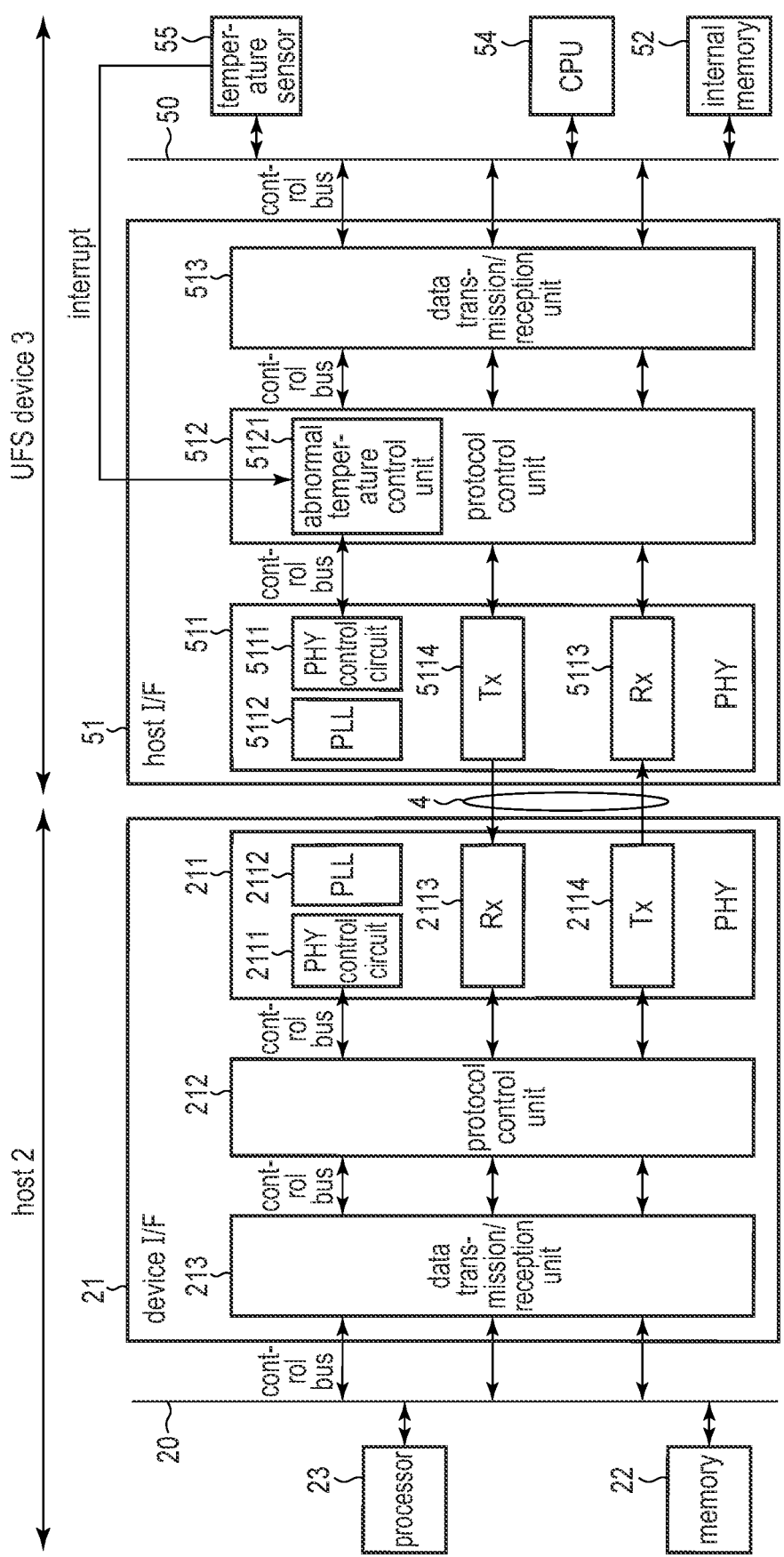
F I G. 10

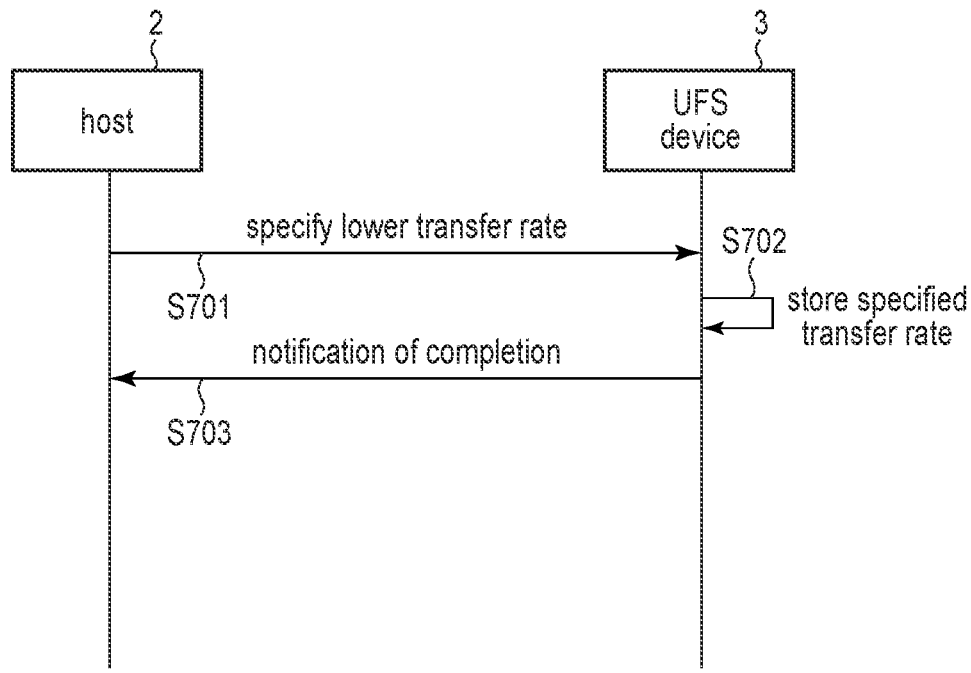
F I G. 13
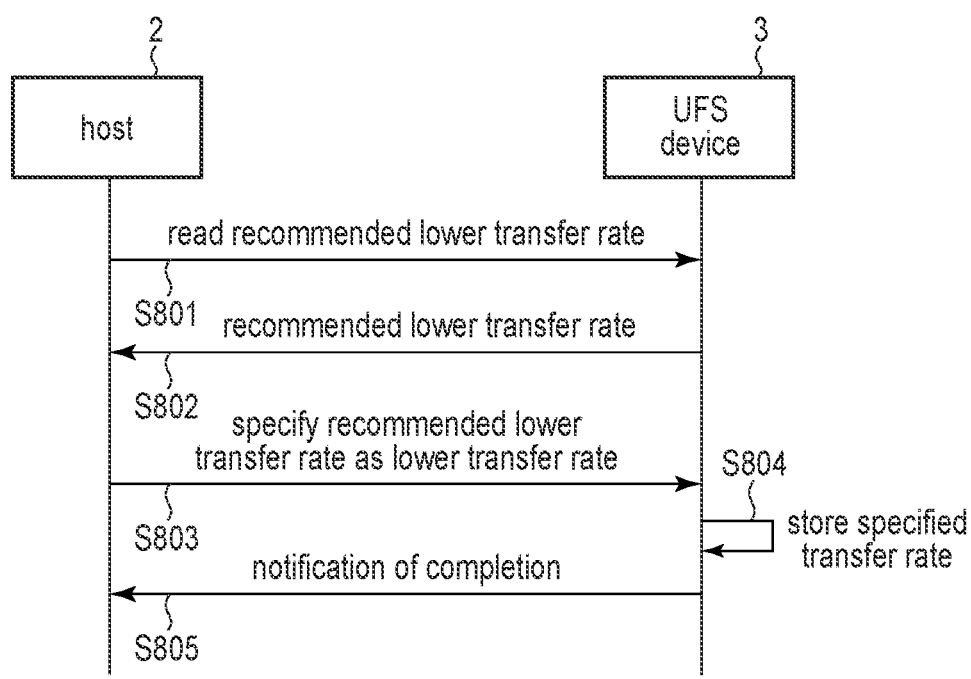
F I G. 14

MEMORY SYSTEM

CROSS-REFERENCE TO RELATED APPLICATIONS

This application is based upon and claims the benefit of priority from Japanese Patent Application No. 2023-041001, filed Mar. 15, 2023, the entire contents of which are incorporated herein by reference.

FIELD

Embodiments described herein relate generally to a technique for controlling a nonvolatile memory.

BACKGROUND

In recent years, a memory system that includes a nonvolatile memory is widely used. A controller of the memory system controls the nonvolatile memory. When the controller operates at a high speed, the temperature of the entire memory system increases due to heat generation of the controller.

The increase in temperature of the memory system leads to, for example, a burn of a user or damage of data stored in the nonvolatile memory. Therefore, a technique capable of suppressing heat generation of the memory system is required.

BRIEF DESCRIPTION OF THE DRAWINGS

FIG. 1 is a block diagram illustrating an example of a configuration of an information processing system including a memory system according to a first embodiment.

FIG. 2 is a block diagram illustrating an internal configuration of a host interface circuit of the memory system according to the first embodiment and an internal configuration of a device interface circuit of a host.

FIG. 3 is a diagram illustrating an example of a plurality of transfer rates supported by a physical layer of the memory system according to the first embodiment.

FIG. 4 is a diagram illustrating a temperature change and a set transfer rate in the memory system according to the first embodiment.

FIG. 5 is a sequence diagram illustrating a procedure of a transfer rate change process based on a transfer rate change request from the host, the transfer rate change process being performed in the information processing system including the memory system according to the first embodiment.

FIG. 10 is a block diagram illustrating an internal configuration of a host interface circuit of a memory system according to a second embodiment and an internal configuration of a device interface circuit of a host.

FIG. 13 is a sequence diagram illustrating a procedure of a lower transfer rate setting process performed in an information processing system including a memory system according to a fourth embodiment.

FIG. 14 is a sequence diagram illustrating a procedure of a recommended lower transfer rate notification process and a lower transfer rate setting process performed in the information processing system including the memory system according to the fourth embodiment.

DETAILED DESCRIPTION

Figure 6:
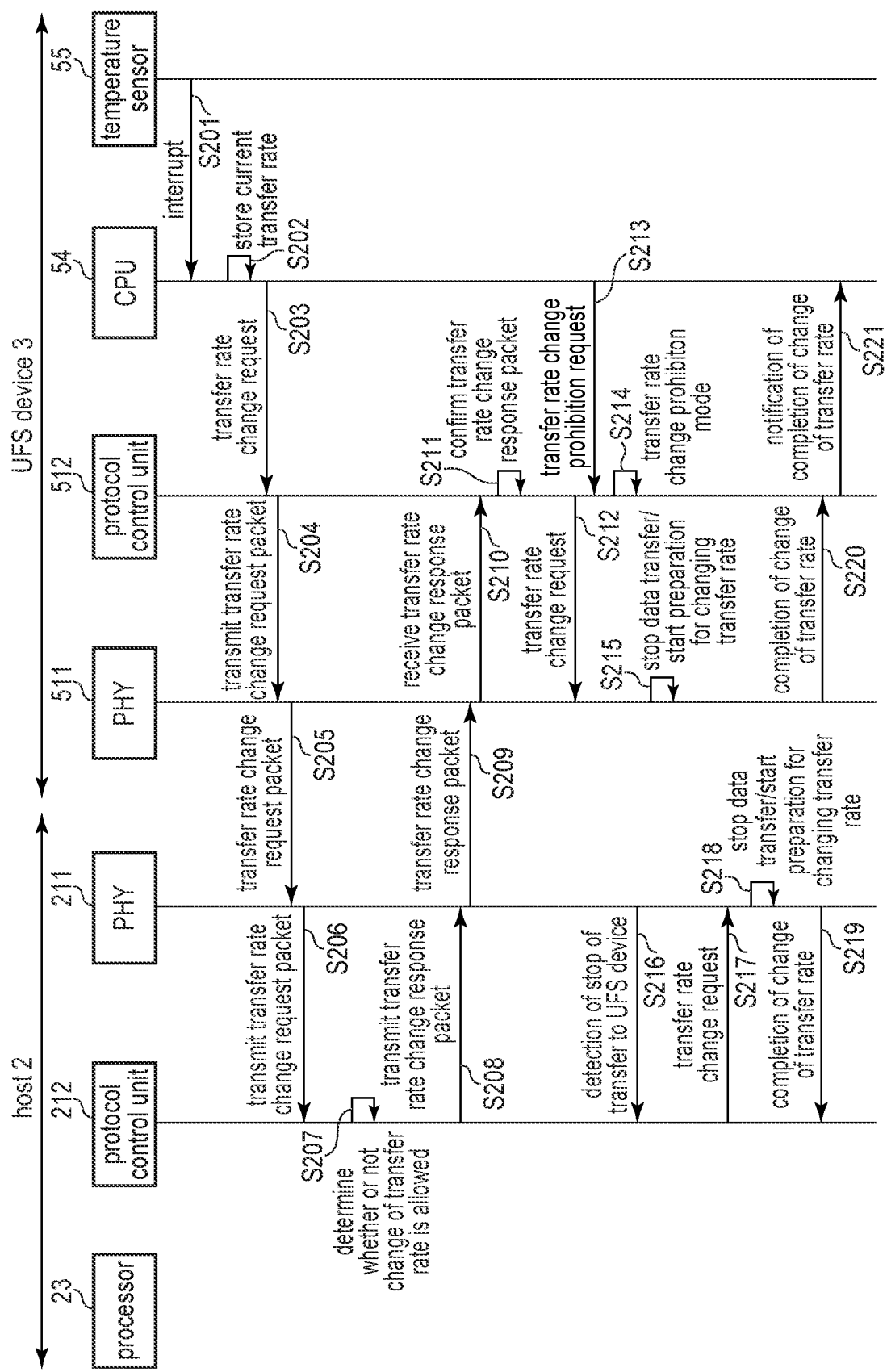
FIG. 6 is a sequence diagram illustrating a procedure of a transfer rate change process at a high temperature, the transfer rate change process being performed in the information processing system including the memory system according to the first embodiment.

In general, according to one embodiment, a memory system is connectable to a host. The memory system comprises a nonvolatile memory, a controller, and a temperature sensor. The controller is electrically connected to the nonvolatile memory. The controller controls writing of data to the nonvolatile memory and reading of data from the nonvolatile memory. The controller includes a host interface circuit. The host interface circuit includes a physical layer and a protocol control circuit. The physical layer performs communication with the host. The protocol control circuit determines a transfer rate between the physical layer and the host. When a temperature detected by the temperature sensor becomes equal to or higher than a first threshold, the protocol control circuit changes the transfer rate from a first transfer rate to a second transfer rate that is lower than the first transfer rate. The protocol control circuit is configured to transition to a first mode in which a change of the transfer rate based on a first request from the host is prohibited.

Hereinafter, each embodiment will be described with reference to the drawings.

Hereinafter, it is assumed that a memory system according to each embodiments is implemented as a universal flash storage (UFS) device. In addition, the memory system may be realized as a solid state drive (SSD) instead of being implemented as a UFS device.

First Embodiment

FIG. 1 is a block diagram illustrating an example of a configuration of an information processing system 1 including a memory system according to a first embodiment. The information processing system 1 includes a host (host device) 2 and a UFS device 3. The host 2 and the UFS device 3 are connectable through a bus 4.

The host 2 is an information processing device. The host 2 is, for example, a personal computer or a mobile terminal. The host 2 accesses the UFS device 3. Specifically, the host 2 transmits a write command, which is a command for writing data, to the UFS device 3. In addition, the host 2 transmits a read command, which is a command for reading data, to the UFS device 3.

The UFS device 3 is a storage device connectable to the host 2. The UFS device 3 includes a nonvolatile memory. The UFS device 3 writes data in the nonvolatile memory. The UFS device 3 reads data from the nonvolatile memory.

Communication between the host 2 and the UFS device 3 is performed through the bus 4. The bus 4 is, for example, a bus conforming to the Mobile Industry Processor Interface™ (MIPI™) standard. The bus 4 is a transmission path that connects the host 2 and the UFS device 3. Communication between the host 2 and the UFS device 3 through the bus 4 is performed in, for example, the initiator-target model. In this case, the host 2 is also referred to as an initiator. The UFS device 3 is also referred to as a target. In the initiator-target model, mainly, the host 2 transmits a request including an instruction to the UFS device 3, and the UFS device 3 transmits a response to the request received from the host 2. That is, communication between the UFS device 3 as the target and the host 2 as the initiator is initiated by the host 2.

Next, a configuration of the host 2 will be described. The host 2 includes a device interface circuit (I/F) 21, a memory 22, and a processor 23. The device I/F 21, the memory 22, and the processor 23 are interconnected through an internal bus 20.

The device I/F 21 is a hardware interface circuit. The device I/F 21 performs communication with the UFS device 3 as the target. Specifically, the device I/F 21 performs communication with a host interface circuit (host I/F) 51 of the UFS device 3. The device I/F 21 includes a PHY 211, a protocol control unit 212, and a data transmission/reception unit 213.

The PHY 211 is a physical layer. The PHY 211 can be implemented by, for example, M-PHY™ conforming to the MIPI standard. The PHY 211 performs communication with the UFS device 3.

The protocol control unit 212 is a control circuit. The protocol control unit 212 is implemented by, for example, UniPro conforming to the MIPI standard. The protocol control unit 212 controls the PHY 211.

The data transmission/reception unit 213 is a data transmission/reception circuit. When transmitting data to the UFS device 3, the data transmission/reception unit 213 transmits the data to the protocol control unit 212. The protocol control unit 212 generates a packet including the data and transmits the generated packet to the PHY 211. The PHY 211 transmits the packet to the UFS device 3 through the bus 4. When a packet is received from the UFS device 3 through the bus 4, the PHY 211 transmits the received packet to the protocol control unit 212. The protocol control unit 212 transmits data included in the packet to the data transmission/reception unit 213.

The memory 22 is, for example, a volatile memory. The memory 22 is also referred to as a main memory, a system memory, or a host memory. The memory 22 is, for example, a random access memory such as a dynamic random access memory (DRAM). A part of a storage area of the memory 22 is used as a data buffer. The data buffer stores write data to be written to the UFS device 3 or read data transferred from the UFS device 3.

The processor 23 is, for example, a central processing unit (CPU). The processor 23 executes software (host software) loaded onto the memory 22. The host software is loaded onto the memory 22 from the UFS device 3 or another storage device provided or connected to the host 2. The host software includes an operating system, a file system, a device driver, an application program, and the like.

Next, a configuration of the UFS device 3 will be described. The UFS device 3 includes a controller 5 and a NAND flash memory 6 (hereinafter, simply referred to as a NAND memory).

The controller 5 is a memory controller. The controller 5 is, for example, a control circuit such as a system-on-a-chip (SoC). The controller 5 is electrically connected to the NAND memory 6. The controller 5 performs writing of data to the NAND memory 6 and reading of data from the NAND memory 6. Examples of a physical interface that connects the controller 5 and the NAND memory 6 include a toggle NAND flash interface or an open NAND flash interface (ONFI).

A function of each unit of the controller 5 can be implemented by dedicated hardware, a processor that executes a program, or a combination thereof. In addition, the controller 5 performs communication with the host 2 through the bus 4.

The NAND memory 6 is a nonvolatile memory. The NAND memory 6 is, for example, a flash memory having a two-dimensional structure or a flash memory having a three-dimensional structure. The NAND memory 6 includes, for example, a plurality of memory dies. The memory die is also referred to as a memory chip. Each of the plurality of memory dies is implemented as a NAND flash memory die. Hereinafter, the memory die is referred to as a NAND die. In FIG. 1, a case where the NAND memory 6 includes 16 NAND dies #0 to #15 is illustrated as an example. Each of the NAND dies #0 to #15 includes a plurality of blocks. Each of the plurality of blocks is a minimum unit of a data erase operation. The data erase operation is an operation of erasing data stored in the NAND memory 6. Each of the plurality of blocks includes a plurality of pages. Each of the plurality of pages includes a plurality of memory cells. Each of the plurality of pages is a unit of a data write operation and a data read operation.

Next, an internal configuration of the controller 5 will be described. The controller 5 includes the host I/F 51, an internal memory (static random access memory (SRAM)) 52, an oscillator 53, a CPU 54, a temperature sensor 55, and a NAND interface circuit (NAND I/F) 56. The host I/F 51, the internal memory 52, the CPU 54, the temperature sensor 55, and the NAND I/F 56 are interconnected through an internal bus 50.

The host I/F 51 is a hardware interface circuit. The host I/F 51 performs communication with the host 2 as the initiator. Specifically, the host I/F 51 performs communication with the device I/F 21 of the host 2. The host I/F 51 includes a PHY 511, a protocol control unit 512, and a data transmission/reception unit 513.

The PHY 511 is a physical layer. The PHY 511 can be implemented, for example, by M-PHY conforming to the MIPI standard. The PHY 511 performs communication with the host 2. Specifically, the PHY 511 communicates with the PHY 211 of the device I/F 21 through the bus 4. The PHY 511 supports a plurality of transfer rates. The transfer rate is an amount of data transmission/reception per unit time. The PHY 511 performs communication with the host 2 at any one of the plurality of transfer rates. That is, communication between the PHY 511 and the PHY 211 through the bus 4 is performed using one of the plurality of transfer rates. At a high transfer rate, a large amount of data is transmitted and received per unit time. On the other hand, at a low transfer rate, less data is transmitted and received per unit time than at a high transfer rate. As the transfer rate used in the PHY 511 increases, a current value of the PHY 511 increases, which leads to an increase in amount of heat generation of the PHY 511.

The protocol control unit 512 is a control circuit. The protocol control unit 512 is realized by, for example, UniPro conforming to the MIPI standard. The protocol control unit 512 controls the PHY 511. The protocol control unit 512 determines the transfer rate between the PHY 511 and the host 2. Hereinafter, the transfer rate between the PHY 511 and the host 2 is also referred to as the transfer rate of the PHY 511. For example, the protocol control unit 512 performs a process of changing the transfer rate of the PHY 511. Specifically, the protocol control unit 512 performs the process of changing the transfer rate of the PHY 511 based on a transfer rate change request from the host 2. In addition, the protocol control unit 512 performs a process of changing the transfer rate of the PHY 511 based on a transfer rate change request from the CPU 54. The transfer rate change request is, for example, a request that specifies a transfer rate to which the current transfer rate of the PHY 511 is intended to be changed (that is, a transfer rate after the change).

In addition, the protocol control unit 512 supports a mode (transfer rate change prohibition mode) in which the change of the transfer rate of the PHY 511 based on the transfer rate change request from the host 2 is prohibited. For example, the protocol control unit 512 transitions to the transfer rate change prohibition mode (also referred to as a first mode) in response to receiving a transfer rate change prohibition request from the CPU 54. In other words, the protocol control unit 512 is set to the transfer rate change prohibition mode by the CPU 54. In a case where the protocol control unit 512 is set to the transfer rate change prohibition mode, the change of the transfer rate of the PHY 511 based on the transfer rate change request received from the host 2 is prohibited. In a case where the transfer rate change request is received from the host 2 while the protocol control unit 512 is in the transfer rate change prohibition mode, the protocol control unit 512 transmits, to the host 2, a response indicating that the transfer rate of the PHY 511 cannot be changed due to a high temperature state.

When in the transfer rate change prohibition mode, the protocol control unit 512 may prohibit only a change of the transfer rate based on a transfer rate change request for increasing the transfer rate of the PHY 511 among the transfer rate change requests received from the host 2, instead of prohibiting changes of the transfer rate based on all the transfer rate change requests received from the host 2. In this case, when the transfer rate change request is received from the host 2 while the protocol control unit 512 is in the transfer rate change prohibition mode, the protocol control unit 512 determines whether or not the transfer rate specified by the transfer rate change request is higher than the current transfer rate of the PHY 511. In a case where the transfer rate specified by the transfer rate change request is higher than the current transfer rate of the PHY 511, the protocol control unit 512 transmits, to the host 2, the response indicating that the transfer rate of the PHY 511 cannot be changed due to the high temperature state. On the other hand, in a case where the transfer rate specified by the transfer rate change request is lower than the current transfer rate of the PHY 511 and the PHY 511 supports the specified transfer rate, the protocol control unit 512 determines that the transfer rate can be changed. Then, the protocol control unit 512 transmits, to the host 2, a response indicating that the transfer rate can be changed, and performs a process of changing the transfer rate of the PHY 511 to the transfer rate specified by the transfer rate change request.

The data transmission/reception unit 513 is a data transmission/reception circuit. When transmitting data to the host 2, the data transmission/reception unit 513 transmits the data to the protocol control unit 512. The protocol control unit 512 generates a packet including the data and transmits the generated packet to the PHY 511. The PHY 511 transmits the packet to the host 2 through the bus 4. When a packet is received from the host 2 through the bus 4, the PHY 511 transmits the received packet to the protocol control unit 512. The protocol control unit 512 transmits data included in the packet to the data transmission/reception unit 513.

The internal memory 52 is a volatile memory. The internal memory 52 is realized by, for example, a static RAM (SRAM). A storage area of the internal memory 52 is used as a work area of the CPU 54. The internal memory 52 includes, for example, the storage area for storing an initial value of the transfer rate in communication between the host I/F 51 and the device I/F 21.

The oscillator 53 is a hardware circuit that generates a clock signal. The oscillator 53 generates the clock signal to be used by each component of the controller 5. The oscillator 53 provides the generated clock signal for each component of the controller 5. The oscillator 53 may be connected to a signal line (not illustrated) for connection to each component of the controller 5, the signal line being different from the internal bus 50.

The CPU 54 is a processor. The CPU 54 controls the host I/F 51, the internal memory 52, the oscillator 53, the temperature sensor 55, and the NAND I/F 56. The CPU 54 loads a control program (firmware) from a read only memory (ROM) (not illustrated) or the NAND memory 6 onto the internal memory 52. The CPU 54 performs various processes by executing the control program (firmware). The firmware may be loaded onto a DRAM (not illustrated) provided in the UFS device 3.

For example, the CPU 54 performs management of data stored in the NAND memory 6 and management of the blocks included in the NAND memory 6, as a flash translation layer (FTL). The management of the data stored in the NAND memory 6 includes, for example, management of mapping information that indicates a relationship between each logical address and each physical address. The CPU 54 manages the mapping information by using a logical to physical translation (L2P) table (not illustrated). The management of the blocks included in the NAND memory 6 includes, for example, wear leveling, garbage collection, and management of bad blocks included in the NAND memory 6.

In addition, the CPU 54 controls the host I/F 51 through the internal bus 50. For example, the CPU 54 transmits, to the protocol control unit 512 of the host I/F 51, a request for changing the current transfer rate of the PHY 511. Then, the CPU 54 receives a notification indicating that the process of changing the transfer rate of the PHY 511 is completed from the protocol control unit 512.

The temperature sensor 55 is a sensor. The temperature sensor 55 measures, for example, an internal temperature of the controller 5. The temperature sensor 55 compares the measured temperature with a threshold. The temperature sensor 55 transmits a notification to the CPU 54 based on the comparison result.

The temperature sensor 55 compares the measured temperature with a threshold A (also referred to as a first threshold). The threshold A is a threshold for determining whether or not the internal temperature of the controller 5 is high. In a case where the temperature is equal to or higher than the threshold A, the temperature sensor 55 transmits a first notification to the CPU 54. The first notification indicates, for example, that the internal temperature of the controller 5 is equal to or higher than the threshold A. Upon receiving the first notification, the CPU 54 determines that the controller is in the high temperature state.

Furthermore, the temperature sensor 55 compares the measured temperature with a threshold B (also referred to as a second threshold). The threshold B indicates a temperature lower than the threshold A. The threshold B is a threshold for determining whether or not the internal temperature of the controller 5 is normal. When the internal temperature of the controller 5 in the high temperature state drops to be equal to or lower than the threshold B, the temperature sensor 55 transmits a second notification to the CPU 54. The second notification indicates, for example, that internal temperature of the controller 5 has become equal to or lower than the threshold B. Upon receiving the second notification, the CPU 54 determines that the internal temperature of the controller 5 has returned to normal.

Here, the temperature sensor 55 is provided as a component of the controller 5, but the temperature sensor 55 may also be provided as a component of the UFS device 3 outside the controller 5. In addition, a plurality of temperature sensors 55 may be provided in the UFS device 3. For example, one temperature sensor 55 may be provided in each of the plurality of NAND dies. In these cases, the temperature sensor 55 can measure a temperature of the UFS device 3. Furthermore, the CPU 54 may estimate the internal temperature of the controller 5 based on temperatures reported from the plurality of temperature sensors 55 or a result of comparison between the temperature and the threshold.

The NAND I/F 56 is a circuit that controls the NAND memory 6. The NAND I/F 56 is electrically connected to the plurality of NAND dies included in the NAND memory 6.

The individual NAND dies are independently operable. Thus, each of the NAND dies functions as a unit operable in parallel. The NAND I/F 56 includes, for example, NAND controllers 561-0, 561-1, . . . , and 561-15. The NAND controllers 561-0, 561-1, . . . , and 561-15 are connected to channels ch0, ch1, . . . , and ch15, respectively. Each of the NAND controllers 561-0, 561-1, . . . , and 561-15 is connected to one or more NAND dies through a corresponding channel. FIG. 1 illustrates a case where one NAND die is connected to each of the channels ch0, ch1, . . . , and ch15. In this case, the NAND controller 561-0 is connected to the NAND die #0 through the channel ch0.

Next, an internal configuration of the host I/F 51 and an internal configuration of the device I/F 21 will be described. FIG. 2 is a diagram illustrating the internal configuration of the host I/F 51 of the UFS device 3 and the internal configuration of the device I/F 21 of the host 2 according to the first embodiment.

First, the internal configuration of the PHY 511 of the host I/F 51 and the internal configuration of the PHY 211 of the device I/F 21 will be described.

The PHY 511 of the host I/F 51 includes a PHY control circuit 5111, a phase locked loop (PLL) 5112, an Rx 5113, and a Tx 5114.

The PHY control circuit 5111 controls the PHY 511. The PHY control circuit 5111 performs a process of controlling the PHY 511 based on a request received from the protocol control unit 212. The PHY control circuit 5111 receives, for example, a transfer rate change request from the protocol control unit 512 through a control bus. When the transfer rate change process is completed, the PHY control circuit 5111 transmits a response to the received transfer rate change request to the protocol control unit 512 through the control bus.

The PLL 5112 is an internal clock generation circuit. The PHY 511 operates in synchronization with an internal clock signal generated by the PLL 5112.

The Rx 5113 is a reception circuit. The Rx 5113 receives data from a Tx 2114 of the PHY 211 through the bus 4. Examples of the data received by the Rx 5113 from the Tx 2114 include a write command and data associated to the write command, a read command, a transfer rate change request packet, and a transfer rate change response packet.

The Tx 5114 is a transmission circuit. The Tx 5114 transmits data to an Rx 2113 of the PHY 211 through the bus 4. Examples of the data transmitted from the Tx 5114 to the Rx 2113 include a completion response for a write command, data corresponding to a read command and a completion response for the read command, a transfer rate change request packet, and a transfer rate change response packet.

Meanwhile, the PHY 211 of the device I/F 21 includes a PHY control circuit 2111, a PLL 2112, the Rx 2113, and the Tx 2114.

The PHY control circuit 2111 controls the PHY 211. The PHY control circuit 2111 controls the PHY 211 based on a request received from the protocol control unit 212.

The PLL 2112 is an internal clock generation circuit. The PHY 211 operates in synchronization with an internal clock signal generated by the PLL 2112.

The Rx 2113 is a reception circuit. The Rx 2113 receives data from the Tx 5114 of the PHY 511 through the bus 4. Examples of the data received by the Rx 2113 from the Tx 5114 include a completion response for a write command, data corresponding to a read command and a completion response for the read command, a transfer rate change request packet, and a transfer rate change response packet.

The Tx 2114 is a transmission circuit. The Tx 2114 transmits data to the Rx 5113 of the PHY 511 through the bus 4. Examples of the data transmitted from the Tx 2114 to the Rx 5113 include a write command and data corresponding to the write command, a read command, a transfer rate change request packet, and a transfer rate change response packet.

Next, communication between the host 2 and the UFS device 3 will be described.

First, in a case where the temperature sensor 55 detects a temperature equal to or higher than the threshold A, the temperature sensor 55 transmits an interrupt to the CPU 54, the interrupt indicating detection of the temperature equal to or higher than the threshold A. The interrupt is transmitted using, for example, a signal line different from the internal bus 50.

Upon receiving the interrupt, the CPU 54 stores the current transfer rate (also referred to as a first transfer rate) of the PHY 511 in the internal memory 52. Then, the CPU 54 requests the host I/F 51 to change the transfer rate of the PHY 511 to a transfer rate lower than the current transfer rate. Specifically, the CPU 54 transmits a transfer rate change request that specifies a transfer rate lower than the current transfer rate of the PHY 511 to the data transmission/reception unit 513 through the control bus. In response to receiving the request, the data transmission/reception unit 513 passes the received request to the protocol control unit 512 through the control bus.

In response to receiving the request, the protocol control unit 512 determines whether or not to perform the process based on the request in the PHY 511. Specifically, the protocol control unit 512 generates a transfer rate change request packet and transmits the generated transfer rate change request packet to the Tx 5114. The Tx 5114 transmits the transfer rate change request packet to the Rx 2113 through the bus 4. At this time, the protocol control unit 512 may add, as supplementary information, information indicating that the UFS device 3 is in the high temperature state to the transfer rate change request packet. Accordingly, when transmitting the transfer rate change request packet, the protocol control unit 512 notifies the host 2 that the temperature of the UFS device 3 is high.

The Rx 2113 transmits the received transfer rate change request packet to the protocol control unit 212. The protocol control unit 212 determines whether or not the PHY 211 supports the transfer rate specified by the received transfer rate change request packet, and generates a transfer rate change response packet. The transfer rate change response packet indicates that the change of the transfer rate of the PHY 211 controlled by the protocol control unit 212 is allowed or is not allowed. The protocol control unit 212 transmits the generated transfer rate change response packet to the Tx 2114.

Then, the Rx 5113 receives the transfer rate change response packet for the transfer rate change request packet transmitted from the Tx 5114, from the Tx 2114 through the bus 4. The protocol control unit 512 receives the transfer rate change response packet for the transmitted transfer rate change request packet from the Rx 5113. Then, the protocol control unit 512 checks whether or not the transfer rate change response packet indicates that the change of the transfer rate is allowed. In a case where the transfer rate change response packet indicates that the change of the transfer rate is allowed, the protocol control unit 512 transmits a transfer rate change request to the PHY control circuit 5111 through the control bus.

Upon receiving the transfer rate change request, the PHY control circuit 5111 performs a process of changing the transfer rate of the PHY 511 based on the received transfer rate change request. When the process is completed, the PHY control circuit 5111 transmits a response indicating that the process is completed to the protocol control unit 512 through the control bus. Then, upon receiving the response, the protocol control unit 512 transmits a response indicating that the process is completed to the CPU 54 through the control bus, the data transmission/reception unit 513, and the internal bus 50.

At this time, the protocol control unit 512 transitions to the transfer rate change prohibition mode. For example, the protocol control unit 512 transitions to the transfer rate change prohibition mode in response to receiving a transfer rate change prohibition request from the CPU 54 through the control bus. When in the transfer rate change prohibition mode, the protocol control unit 512 prohibits the change of the transfer rate of the PHY 511 based on the transfer rate change request received from the host 2. The protocol control unit 512 can transition to the transfer rate change prohibition mode in response to completion of the process of changing the transfer rate or a request received from the CPU 54.

It is assumed that, thereafter, the temperature sensor 55 detects a temperature equal to or lower than the threshold B. Upon detecting the temperature equal to or lower than the threshold B, the temperature sensor 55 transmits an interrupt (also referred to as a second notification) indicating that the measured temperature is equal to or lower than the threshold B to the CPU 54. The interrupt can also be transmitted using a signal line different from the internal bus 50.

Upon receiving the interrupt, the CPU 54 acquires the transfer rate (first transfer rate) before the change from the internal memory 52. Then, the CPU 54 requests the protocol control unit 512 to cancel the setting of the transfer rate change prohibition mode. Upon receiving the request, the protocol control unit 512 cancels the setting of the transfer rate change prohibition mode. Then, the protocol control unit 512 may transmit a response indicating that the process of canceling the setting of the transfer rate change prohibition mode is completed to the CPU 54.

The CPU 54 requests the host I/F 51 to change the transfer rate of the PHY 511 to the first transfer rate. Specifically, the CPU 54 transmits a transfer rate change request that specifies the first transfer rate to the data transmission/reception unit 513 through the control bus. Upon receiving the request, the data transmission/reception unit 513 passes the received request to the protocol control unit 512 through the control bus.

Upon receiving the request, the protocol control unit 512 determines whether or not to perform the process based on the request in the PHY 511. Specifically, the protocol control unit 512 generates a transfer rate change request packet and transmits the generated transfer rate change request packet to the Tx 5114. The Tx 5114 transmits the transfer rate change request packet to the Rx 2113 through the bus 4. At this time, the protocol control unit 512 may add, as supplementary information, information indicating that the temperature of the controller 5 has returned to normal to the transfer rate change request packet. Accordingly, when transmitting the transfer rate change request packet, the protocol control unit 512 notifies the host 2 that the temperature of the controller 5 is the normal temperature.

The Rx 2113 transmits the received transfer rate change request packet to the protocol control unit 212. The protocol control unit 212 determines whether or not the PHY 211 supports the transfer rate specified by the received transfer rate change request packet, and generates a transfer rate change response packet. The protocol control unit 212 transmits the generated transfer rate change response packet to the Tx 2114.

Then, the Rx 5113 receives the transfer rate change response packet for the transfer rate change request packet transmitted from the Tx 5114, from the Tx 2114 through the bus 4. The protocol control unit 512 receives, from the Rx 5113, the transfer rate change response packet corresponding to the transmitted transfer rate change request packet. Then, the protocol control unit 512 checks whether or not the transfer rate change response packet indicates that the change of the transfer rate is allowed. In a case where the transfer rate change response packet indicates that the change of the transfer rate is allowed, the protocol control unit 512 transmits a transfer rate change request to the PHY control circuit 5111 through the control bus.

Upon receiving the transfer rate change request, the PHY control circuit 5111 performs a process of changing the transfer rate of the PHY 511 based on the received transfer rate change request. When the process is completed, the PHY control circuit 5111 transmits a response indicating that the process is completed to the protocol control unit 512 through the control bus. Then, upon receiving the response, the protocol control unit 512 transmits a response indicating that the process is completed to the CPU 54 through the control bus, the data transmission/reception unit 513, and the internal bus 50.

Next, the plurality of transfer rates used in communication between the PHY 511 and the PHY 211 will be described. FIG. 3 is a diagram illustrating an example of the plurality of transfer rates supported by the PHY 511 of the memory system according to the first embodiment. Here, it is assumed that the PHY 511 supports five transfer rates. For example, five transfer rates are specified in the MIPI™ standard. Each of the five transfer rates may correspond to, for example, one mode (for example, High Speed-Gear (HS-G)). The five HS-Gs are HS-G1, HS-G2, . . . , and HS-G5.

HS-G1 corresponds to the lowest transfer rate among the five HS-Gs. An amount of data transmission/reception per unit time of the PHY 511 set to HS-G1 is the smallest as compared with the PHY 511 set to another HS-G. A current value of the PHY 511 set to HS-G1 is lower than that of the PHY 511 set to other HS-Gs. Due to the lower current value, power consumption of the PHY 511 set to HS-G1 is also lower than that of the PHY 511 set to other HS-Gs. That is, the amount of heat generation of the PHY 511 set to HS-G1 is the smallest among those for the five HS-Gs.

HS-G2 corresponds to the second lowest transfer rate among the five HS-Gs. The PHY 511 set to HS-G2 can transmit and receive more data per unit time than the PHY 511 set to HS-G1. A current value of the PHY 511 set to HS-G2 is higher than that of the PHY 511 set to HS-G1. Due to the higher current value, power consumption of the PHY 511 set to HS-G2 is higher than that of the PHY 511 set to HS-G1. That is, the amount of heat generation of the PHY 511 set to HS-G2 is smaller than that of the PHY 511 set to any HS-Gs other than HS-G1.

HS-G3 corresponds to the third lowest transfer rate among the five HS-Gs. The PHY 511 set to HS-G3 can transmit and receive more data per unit time than the PHY 511 set to HS-G1 or HS-G2. A current value of the PHY 511 set to HS-G3 is higher than that of the PHY 511 set to HS-G1 or HS-G2. Due to the higher current value, power consumption of the PHY 511 set to HS-G3 is higher than that of the PHY 511 set to HS-G1 or HS-G2. That is, the amount of heat generation of the PHY 511 set to HS-G3 is smaller than that of the PHY 511 set to HS-G4 and HS-G5.

HS-G4 corresponds to the second highest transfer rate among the five HS-Gs. The PHY 511 set to HS-G4 can transmit and receive more data per unit time than the PHY 511 set to HS-G1 to HS-G3. Therefore, a current value of the PHY 511 set to HS-G4 is higher than that of the PHY 511 set to HS-G1 to HS-G3, and is lower than that of the PHY 511 set to HS-G5. Due to the lower current value, power consumption of the PHY 511 set to HS-G4 is lower than that of the PHY 511 set to HS-G5. That is, the amount of heat generation of the PHY 511 set to HS-G4 is the second largest among the five HS-Gs.

HS-G5 corresponds to the highest transfer rate among the five HS-Gs. The PHY 511 set to HS-G5 can transmit and receive the most data per unit time than the PHY 511 set to other HS-Gs. Therefore, a current value of the PHY 511 set to HS-G5 is higher than that of the PHY 511 using other HS-Gs. Due to the higher current value, power consumption of the PHY 511 set to HS-G5 is higher than that of the PHY 511 set to other HS-Gs. That is, the amount of heat generation of the PHY 511 set to HS-G5 is the largest among those for the five HS-Gs.

A difference in transfer rate between the HS-Gs can correspond to, for example, a difference in operating frequency of the PHY 511. The higher the operating frequency of the PHY 511, the higher the transfer rate of the PHY 511. The transfer rate of the PHY 211 is synchronized with the transfer rate of the PHY 211. In addition, the transfer rate of the PHY 511 (and the PHY 211) may be changed by changing the number of lanes of the bus 4 to be used in each HS-G. For example, in a state in which HS-G1 is set, the transfer rate of the PHY 511 is changed to a lower transfer rate by halving the number of lanes to be used.

Next, a process of changing the transfer rate based on a change of the internal temperature of the controller 5 of the UFS device 3 will be described. FIG. 4 is a diagram illustrating a temperature change and a set transfer rate in the UFS device 3 according to the first embodiment.

Here, a case where the HS-G corresponding to one transfer rate is set for the PHY 511 will be assumed.

A vertical axis in FIG. 4 represents a temperature measured by the temperature sensor 55. A horizontal axis in FIG. 4 represents time.

In an initial state (time 0), the HS-G of the PHY 511 is set to HS-G5 in which communication is performed at the highest transfer rate among the HS-Gs supported by the PHY 511 and the PHY 211.

While HS-G5 is set, the PHY 511 operates at a high current value, which leads to an increase in amount of heat generation. Therefore, the internal temperature of the controller 5 measured by the temperature sensor 55 gradually increases.

At time t1, the temperature sensor 55 detects that the internal temperature of the controller 5 becomes equal to or higher than the threshold A. Then, the temperature sensor 55 transmits, to the CPU 54, an interrupt indicating that the internal temperature of the controller 5 is equal to or higher than the threshold A. Upon receiving the interrupt, the CPU 54 stores information indicating the current HS-G5 in the internal memory 52. Then, the CPU 54 transmits, to the protocol control unit 512, a transfer rate change request that specifies HS-G1 corresponding to the transfer rate lower than the transfer rate corresponding to HS-G5. As a HS-G specified by the CPU 54, for example, HS-G1 that corresponds to the lowest transfer rate is selected among the plurality of HS-Gs supported by the PHY 511. The protocol control unit 512 sets the PHY 511 to HS-G1 based on the received transfer rate change request.

While HS-G1 is set, the PHY 511 operates at a lower current value than when other HS-Gs are set. Therefore, the amount of heat generation of the PHY 511 as a heat generation source decreases. When the amount of heat generation of the entire controller 5 falls below an amount of a heat radiation of the controller 5, the internal temperature of the controller 5 gradually decreases.

At time t2, the temperature sensor 55 detects that the internal temperature of the controller 5 becomes equal to or lower than the threshold B. Then, the temperature sensor 55 transmits, to the CPU 54, an interrupt indicating that the internal temperature of the controller 5 is equal to or lower than the threshold B. Upon receiving the interrupt, the CPU 54 transmits, to the protocol control unit 512, a transfer rate change request that specifies HS-G5 that is the HS-G before the change at time t1. That is, the CPU 54 issues the transfer rate change request in such a way that the HS-G before HS-G1 is set for the PHY 511 again. The protocol control unit 512 sets the PHY 511 to HS-G5 based on the received transfer rate change request.

Next, the change of the transfer rate based on the transfer rate change request from the host 2 will be described. FIG. 5 is a sequence diagram illustrating a procedure of a transfer rate change process based on the transfer rate change request from the host 2, the transfer rate change process being performed in the information processing system 1 including the UFS device 3 according to the first embodiment.

For example, the host 2 starts the transfer rate change process to increase the transfer rate of the PHY 211, in response to the fact that processing of a command to be transmitted to the UFS device 3 is delayed due to the current transfer rate of the PHY 211 being low.

First, the processor 23 of the host 2 transmits a transfer rate change request to the protocol control unit 212 (step S101). The transfer rate change request specifies a transfer rate to which the current transfer rate is intended to be changed. The transfer rate change request may specify one HS-G instead of specifying the transfer rate.

The protocol control unit 212 transmits, to the PHY 211, a transfer rate change request packet corresponding to the transfer rate specified by the transfer rate change request received in S101 (step S102).

The PHY 211 transmits, to the PHY 511, the transfer rate change request packet received in S102 (step S103).

The PHY 511 transmits, to the protocol control unit 512, the transfer rate change request packet received in S103 (step S104).

In response to the reception of the transfer rate change request packet in S104, the protocol control unit 512 determines whether or not the change of the transfer rate of the PHY 511 is allowed (step S105). For example, the protocol control unit 512 determines whether or not the transfer rate specified by the transfer rate change request packet is supported by the PHY 511. Here, since the PHY 511 supports the specified transfer rate, the protocol control unit 512 determines that the transfer rate of the PHY 511 can be changed to the specified transfer rate.

The protocol control unit 512 generates a transfer rate change response packet including information indicating the result of the determination in S105, and transmits the generated transfer rate change response packet to the PHY 511 (step S106). The transfer rate change response packet indicates that the change of the transfer rate of the PHY 511 controlled by the protocol control unit 512 is allowed or is not allowed. The transfer rate change response packet generated in S106 includes information indicating that the change of the transfer rate of the PHY 511 is allowed.

The PHY 511 transmits the transfer rate change response packet received in S106 to the PHY 211 (step S107).

The PHY 211 transmits the transfer rate change response packet received in S107 to the protocol control unit 212 (step S108).

The protocol control unit 212 checks the transfer rate change response packet received in S108 (step S109). The protocol control unit 212 checks that the transfer rate change response packet includes information indicating that the change of the transfer rate of the PHY 511 is allowed.

The protocol control unit 212 transmits a transfer rate change request to the PHY 211 based on the result of the checking in S109 (step S110). Specifically, the protocol control unit 212 transmits the transfer rate change request to the PHY control circuit 2111 through the control bus.

Upon receiving the transfer rate change request in S110, the PHY 211 stops data transfer to the PHY 511 and starts preparation for changing the transfer rate (step S111). Specifically, upon receiving the transfer rate change request, the PHY control circuit 2111 stops data transmission of the Tx 2114. Then, the PHY control circuit 2111 starts preparation for changing the transfer rate.

In response to the stop of the data transfer from the PHY 211, the PHY 511 notifies detection of the stop of the transfer to the host, to the protocol control unit 512 (step S112). Specifically, the Rx 5113 detects that the data transmission from the Tx 2114 is stopped, and notifies the PHY control circuit 5111 of the stop. Upon receiving the notification from the Rx 5113, the PHY control circuit 5111 notifies the protocol control unit 512 that the stop of the transfer to the host has been detected through the control bus.

Upon receiving the notification in S112, the protocol control unit 512 transmits a transfer rate change request to the PHY 511 (step S113). The transfer rate change request specifies the transfer rate specified by the transfer rate change request packet received in S104. Specifically, the protocol control unit 512 transmits a transfer rate change request that specifies a transfer rate to which the current transfer rate is intended to be changed, to the PHY control circuit 5111 through the control bus.

Upon receiving the transfer rate change request in S113, the PHY 511 stops data transfer to the PHY 211 and starts preparation for changing the transfer rate (step S114). Specifically, upon receiving the transfer rate change request, the PHY control circuit 5111 stops data transmission of the Tx 5114.

When the process of changing the transfer rate of communication between the PHY 211 and the PHY 511 is completed, the PHY 211 notifies the protocol control unit 212 of the completion of the change of the transfer rate (step S115). Then, upon receiving the notification in S115, the protocol control unit 212 notifies the processor 23 of the completion of the change of the transfer rate (step S116).

In addition, the PHY 511 notifies the protocol control unit 512 of the completion of the change of the transfer rate (step S117). Then, upon receiving the notification in S117, the protocol control unit 512 notifies the CPU 54 of the completion of the change of the transfer rate (step S118).

In this manner, the transfer rate of communication between the PHY 211 and the PHY 511 is changed to the transfer rate specified by the transfer rate change request generated by the processor 23, based on the transfer rate change request issued by the processor 23 of the host 2.

Next, a case where a process of changing the transfer rate is performed based on an interrupt issued by the temperature sensor 55 of the UFS device 3, the interrupt indicating that the temperature of the controller 5 is high will be described. FIG. 6 is a sequence diagram illustrating a procedure of a transfer rate change process at a high temperature performed in the information processing system 1 including the UFS device 3 according to the first embodiment.

For example, when the temperature sensor 55 detects a temperature equal to or higher than the threshold A, the CPU 54 of the UFS device 3 starts the transfer rate change process in order to suppress the amount of heat generation of the PHY 511.

First, the temperature sensor 55 transmits an interrupt to the CPU 54 in response to detection of a temperature equal to or higher than the threshold A (step S201). The temperature measured by the temperature sensor 55 is, for example, the internal temperature of the controller 5. In addition, the temperature sensor 55 may transmit the measured temperature to the CPU 54, instead of notifying of the interrupt. In this case, the CPU 54 compares the received temperature with the threshold A. In a case where the received temperature is equal to or higher than the threshold A, the CPU 54 proceeds to the subsequent operation.

Upon receiving the interrupt in S201, the CPU 54 stores the current transfer rate of the PHY 511 in the internal memory 52 (step S202). The CPU 54 may store the current HS-G of the PHY 511 in the internal memory 52, instead of the current transfer rate.

Then, the CPU 54 transmits a transfer rate change request to the protocol control unit 512 (step S203). The transfer rate change request specifies a transfer rate to which the current transfer rate is intended to be changed. The transfer rate change request may specify a HS-G instead of specifying the transfer rate.

The protocol control unit 512 transmits, to the PHY 511, a transfer rate change request packet corresponding to the transfer rate specified by the transfer rate change request received in S203 (step S204).

The PHY 511 transmits the transfer rate change request packet received in S204 to the PHY 211 (step S205).

The PHY 211 transmits the transfer rate change request packet received in S205 to the protocol control unit 212 (step S206).

The protocol control unit 212 determines, in response to the reception of the transfer rate change request packet in S206, whether or not the transfer rate of the PHY 211 can be changed (step S207). For example, the protocol control unit 212 determines whether or not the transfer rate specified by the transfer rate change request packet is supported by the PHY 211. Here, since the PHY 211 supports the specified transfer rate, the protocol control unit 212 determines that the transfer rate of the PHY 211 can be changed to the specified transfer rate.

The protocol control unit 212 generates a transfer rate change response packet including information indicating the result of the determination in S207, and transmits the generated transfer rate change response packet to the PHY 211 (step S208). The transfer rate change response packet generated in S208 includes information indicating that the change of the transfer rate of the PHY 211 is allowed.

The PHY 211 transmits the transfer rate change response packet received in S208 to the PHY 511 (step S209).

The PHY 511 transmits the transfer rate change response packet received in S209 to the protocol control unit 512 (step S210).

The protocol control unit 512 checks the transfer rate change response packet received in S209 (step S211). The protocol control unit 512 checks that the transfer rate change response packet includes information indicating that the change of the transfer rate of the PHY 211 is allowed.

The protocol control unit 512 transmits a transfer rate change request to the PHY 511 based on the result of the checking in S211 (step S212). Specifically, the protocol control unit 512 transmits a transfer rate change request that specifies a transfer rate to which the current transfer rate is intended to be changed, to the PHY control circuit 5111 through the control bus.

The CPU 54 transmits a transfer rate change prohibition request to the protocol control unit 512 (step S213). For example, the CPU 54 transmits the transfer rate change prohibition request to the protocol control unit 512, in response to the transmission of the transfer rate change request to the PHY 511 by the protocol control unit 512.

The protocol control unit 512 transitions to the transfer rate change prohibition mode in response to the reception of the transfer rate change prohibition request in S213 (step S214). While in the transfer rate change prohibition mode, the protocol control unit 512 prohibits the change of the transfer rate of the PHY 511 based on the transfer rate change request from the host 2.

Upon receiving the transfer rate change request in S212, the PHY 511 stops data transfer to the PHY 211 and starts preparation for changing the transfer rate (step S215). Specifically, upon receiving the transfer rate change request, the PHY control circuit 5111 stops data transmission of the Tx 5114.

In response to the stop of the data transfer from the PHY 511, the PHY 211 notifies the protocol control unit 212 of detection of the stop of the transfer to the UFS device 3 (step S216).

Specifically, the Rx 2113 detects that the data transmission from the Tx 5114 is stopped, and notifies the PHY control circuit 2111 of the stop. Upon receiving the notification from Rx 2113, the PHY control circuit 2111 notifies the protocol control unit 212 that the stop of the transfer to the UFS device has been detected through the control bus.

Upon receiving the notification in S216, the protocol control unit 212 transmits a transfer rate change request to the PHY 211 (step S217). The transfer rate change request specifies the transfer rate specified by the transfer rate change request packet received in S206. Specifically, the protocol control unit 212 transmits the transfer rate change request that specifies a transfer rate to which the current transfer rate is intended to be changed, to the PHY control circuit 2111 through the control bus.

Upon receiving the transfer rate change request in S217, the PHY 211 stops data transfer to the PHY 511 and starts preparation for changing the transfer rate (step S218). Specifically, upon receiving the transfer rate change request, the PHY control circuit 2111 stops data transmission of the Tx 2114.

When the process of changing the transfer rate of communication between the PHY 211 and the PHY 511 is completed, the PHY 211 notifies the protocol control unit 212 of the completion of the change of the transfer rate (step S219).

In addition, the PHY 511 notifies the protocol control unit 512 of the completion of the change of the transfer rate (step S220). Then, upon receiving the notification in S220, the protocol control unit 512 notifies the CPU 54 of the completion of the change of the transfer rate (step S221).

In this manner, the transfer rate of communication between the PHY 211 and the PHY 511 is changed to the transfer rate specified by the transfer rate change request generated by the CPU 54, based on the interrupt issued by the temperature sensor 55 of the UFS device 3.

Figure 7:
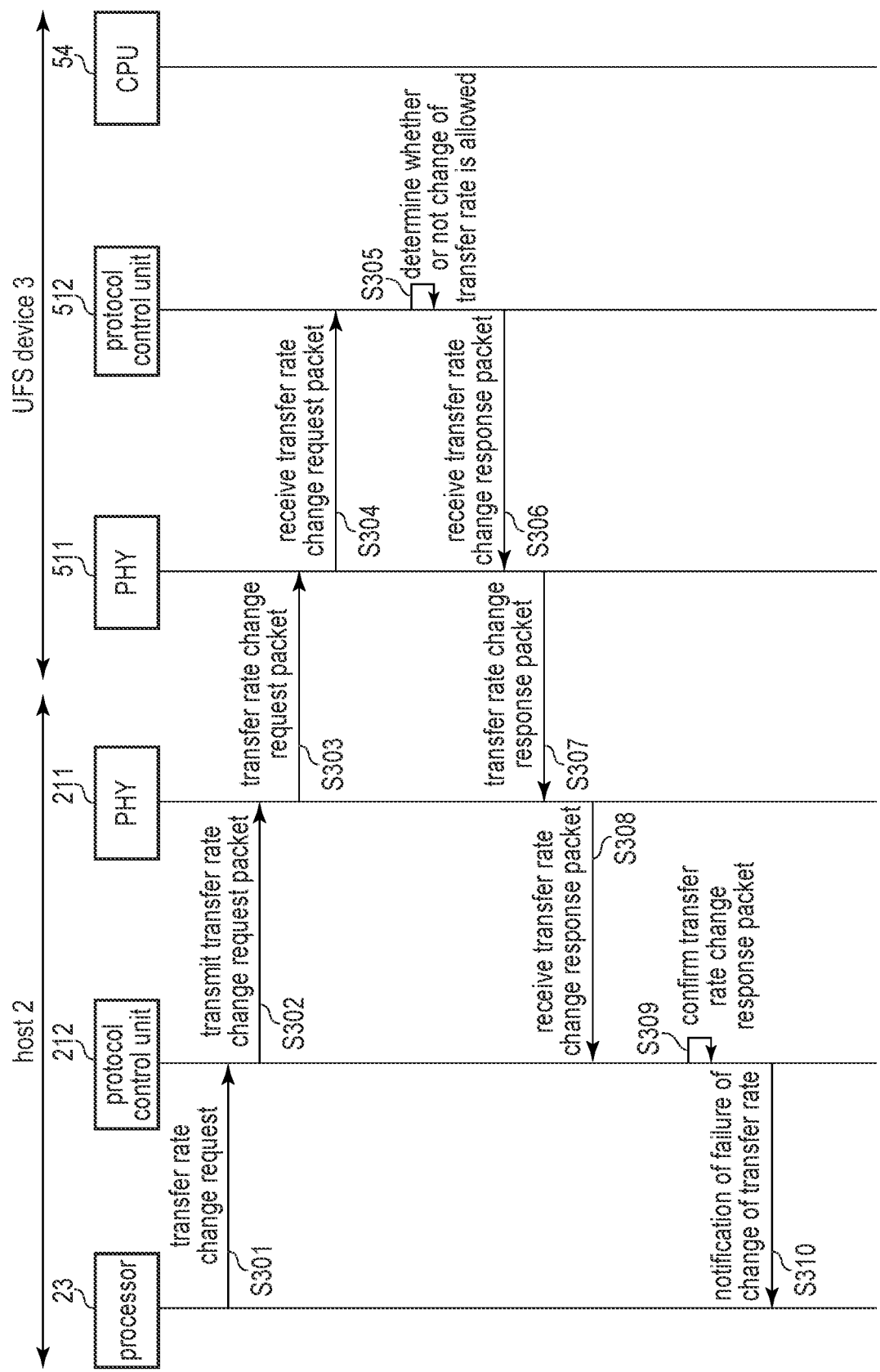
FIG. 7 is a sequence diagram illustrating a procedure of a transfer rate change prohibition process performed in the information processing system including the memory system according to the first embodiment.

Next, a transfer rate change process in a case where the controller 5 receives a transfer rate change request from the host 2 when in the transfer rate change prohibition mode will be described. FIG. 7 is a sequence diagram illustrating a procedure of a transfer rate change prohibition process performed in the information processing system 1 including the UFS device 3 according to the first embodiment. Here, the protocol control unit 512 is set to the transfer rate change prohibition mode.

For example, in a case where a transfer rate lower than the transfer rate before the change is set by the process described in FIG. 6, the host 2 may issue a transfer rate change request for changing the transfer rate to a higher rate to the UFS device 3 again. In this case, the process of FIG. 7 is performed.

Processes from step S301 to step S304 in FIG. 7 are similar to the processes from S101 to S104 described in FIG. 5.

Upon receiving a transfer rate change request packet in S304, the protocol control unit 512 determines whether or not the change of the transfer rate of the PHY 511 is allowed based on the received transfer rate change request (step S305). At this time, the protocol control unit 512 determines whether or not the protocol control unit 512 is in the transfer rate change prohibition mode in addition to determining whether or not the PHY 511 supports the transfer rate specified by the transfer rate change request received in S304.

At this time, since the protocol control unit 512 is set to the transfer rate change prohibition mode, the protocol control unit 512 operates to prohibit the change of the transfer rate based on the transfer rate change request from the host 2. That is, the protocol control unit 512 determines that the transfer rate cannot be changed.

Alternatively, consider a case where the protocol control unit 512 is set to the transfer rate change prohibition mode, and thus only a change to a transfer rate higher than the current transfer rate of the PHY 511 is prohibited and a change to a transfer rate lower than the current transfer rate of the PHY 511 is allowed. In this case, the protocol control unit 512 further determines whether or not the transfer rate specified by the transfer rate change request packet received in S304 is higher than the current transfer rate of the PHY 511. In a case where the transfer rate specified by the transfer rate change request packet received in S304 is higher than the current transfer rate of the PHY 511, the protocol control unit 512 determines that the transfer rate cannot be changed. On the other hand, in a case where the transfer rate specified by the transfer rate change request packet received in S304 is lower than the current transfer rate of the PHY 511, the protocol control unit 512 determines that the transfer rate can be changed.

Hereinafter, it is assumed that the protocol control unit 512 determines that the transfer rate cannot be changed.

The protocol control unit 512 generates a transfer rate change response packet including information indicating the result of the determination in S305, and transmits the generated transfer rate change response packet to the PHY 511 (step S306). The transfer rate change response packet generated in S306 includes information indicating that the transfer rate of the PHY 511 cannot be changed. In addition, the transfer rate change response packet may include information indicating that the protocol control unit 512 cannot change the transfer rate of the PHY 511 due to the high temperature state.

The PHY 511 transmits the transfer rate change response packet received in S306 to the PHY 211 (step S307).

The PHY 211 transmits the transfer rate change response packet received in S307 to the protocol control unit 212 (step S308).

The protocol control unit 212 checks the transfer rate change response packet received in S308 (step S309). The protocol control unit 212 checks that the transfer rate change response packet includes the information indicating that the change of the transfer rate is not allowed.

The protocol control unit 212 notifies the processor 23 of a transfer rate change failure based on the result of the checking in S309 (step S310). In addition, the content reported in S310 may include information indicating that the protocol control unit 512 is in the transfer rate change prohibition mode and that the UFS device 3 is in the high temperature state.

As described above, the protocol control unit 512 of the UFS device 3 can maintain the current transfer rate of the PHY 511 even in a case where a transfer rate change request is issued from the host 2 during the transfer rate change prohibition mode.

Figure 8:
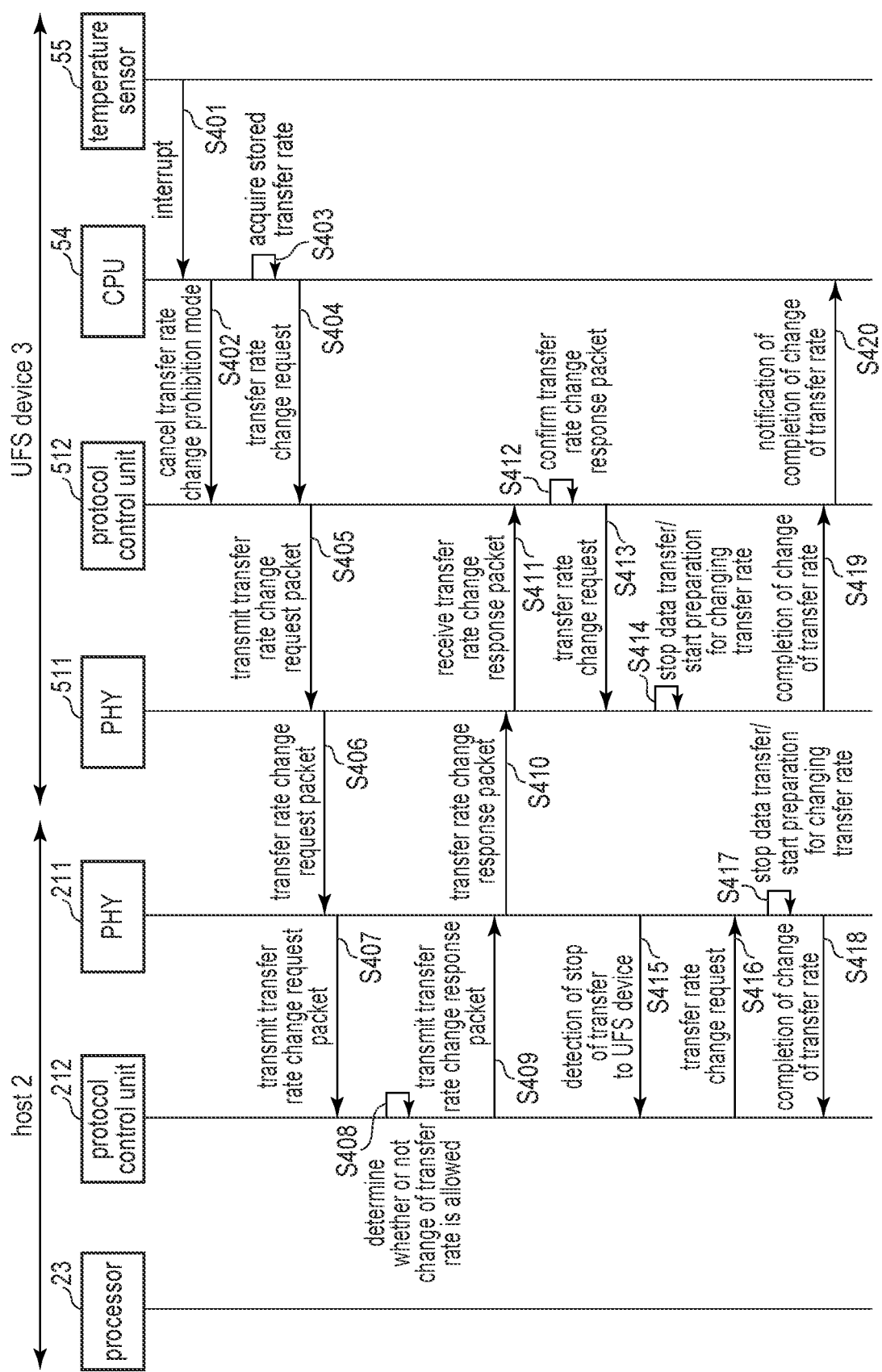
FIG. 8 is a sequence diagram illustrating a procedure of a transfer rate change process at the time of a temperature decrease, the transfer rate change process being performed in the information processing system including the memory system according to the first embodiment.

Next, a transfer rate change process performed based on an interrupt issued by the temperature sensor 55 of the UFS device 3 when the temperature of the controller 5 in the high temperature state returns to normal will be described. FIG. 8 is a sequence diagram illustrating a procedure of a transfer rate change process at the time of a temperature decrease performed in the information processing system 1 including the UFS device 3 according to the first embodiment.

For example, after the process described with reference to FIG. 6, the CPU 54 of the UFS device 3 starts a transfer rate change process for restoring the transfer rate of the PHY 511 to the original transfer rate when the temperature sensor 55 detects a temperature equal to or lower than the threshold B.

First, the temperature sensor 55 transmits an interrupt to the CPU 54 in response to detection of a temperature equal to or lower than the threshold B (step S401).

Upon receiving the interrupt in S401, the CPU 54 requests the protocol control unit 512 to cancel the setting of the transfer rate change prohibition mode (step S402).

The CPU 54 acquires a transfer rate stored in the internal memory 52 (step S403). The CPU 54 may acquire information indicating a HS-G from the internal memory 52 instead of the transfer rate.

Then, the CPU 54 transmits a transfer rate change request to the protocol control unit 512 (step S404). The transfer rate change request specifies the transfer rate acquired in S403. The transfer rate change request may specify a HS-G instead of specifying the transfer rate.

The protocol control unit 512 transmits, to the PHY 511, a transfer rate change request packet corresponding to the transfer rate specified by the transfer rate change request received in S404 (step S405).

The PHY 511 transmits the transfer rate change request packet received in S405 to the PHY 211 (step S406).

The PHY 211 transmits the transfer rate change request packet received in S406 to the protocol control unit 212 (step S407).

The protocol control unit 212 determines whether or not the transfer rate of the PHY 211 can be changed to the transfer rate specified by the transfer rate change request packet received in S407 (step S408). For example, the protocol control unit 212 determines whether or not the transfer rate specified by the transfer rate change request packet is supported by the PHY 211. Since the PHY 211 supports the specified transfer rate, the protocol control unit 212 determines that the transfer rate of the PHY 211 can be changed to the specified transfer rate.

The protocol control unit 212 generates a transfer rate change response packet including information indicating the result of the determination in S408, and transmits the generated transfer rate change response packet to the PHY 211 (step S409). The transfer rate change response packet generated in S409 includes information indicating that the transfer rate of the PHY 211 can be changed to the specified transfer rate.

The PHY 211 transmits the transfer rate change response packet received in S409 to the PHY 511 (step S410).

The PHY 511 transmits the transfer rate change response packet received in S410 to the protocol control unit 512 (step S411).

The protocol control unit 512 checks the transfer rate change response packet received in S411 (step S412). The protocol control unit 512 checks that the transfer rate change response packet includes information indicating that the transfer rate of the PHY 211 can be changed.

The protocol control unit 512 transmits a transfer rate change request to the PHY 511 based on the result of the checking in S412 (step S413). Specifically, the protocol control unit 512 transmits a transfer rate change request that specifies a transfer rate to which the current transfer rate is intended to be changed, to the PHY control circuit 5111 through the control bus.

Upon receiving the transfer rate change request in S413, the PHY 511 stops data transfer to the PHY 211 and starts preparation for changing the transfer rate (step S414). Specifically, upon receiving the transfer rate change request, the PHY control circuit 5111 stops data transmission of the Tx 5114.

In response to the stop of the data transfer from the PHY 511, the PHY 211 notifies the protocol control unit 212 of detection of the stop of the transfer to the UFS device 3 (step S415).

Specifically, the Rx 2113 detects that the data transmission from the Tx 5114 is stopped, and notifies the PHY control circuit 2111 of the stop. Upon receiving the notification from Rx 2113, the PHY control circuit 2111 notifies the protocol control unit 212 that the stop of the transfer to the UFS device 3 has been detected through the control bus.

Upon receiving the notification in S415, the protocol control unit 212 transmits a transfer rate change request to the PHY 211 (step S416). The transfer rate change request specifies the transfer rate specified by the transfer rate change request packet received in S407. Specifically, the protocol control unit 212 transmits the transfer rate change request that specifies a transfer rate to which the current transfer rate is intended to be changed, to the PHY control circuit 2111 through the control bus.

Upon receiving the transfer rate change request in S416, the PHY 211 stops data transfer to the PHY 511 and starts preparation for changing the transfer rate (step S417). Specifically, upon receiving the transfer rate change request, the PHY control circuit 2111 stops data transmission of the Tx 2114.

When the process of changing the transfer rate of communication between the PHY 211 and the PHY 511 is completed, the PHY 211 notifies the protocol control unit 212 of the completion of the change of the transfer rate (step S418).

In addition, the PHY 511 notifies the protocol control unit 512 of the completion of the change of the transfer rate (step S419). Then, upon receiving the notification in S419, the protocol control unit 512 notifies the CPU 54 of the completion of the change of the transfer rate (step S420).

In this manner, the controller 5 of the UFS device 3 can restore the transfer rate of the PHY 511 to the transfer rate before the change in response to the internal temperature of the controller 5 decreasing to the normal temperature.

Figure 9:
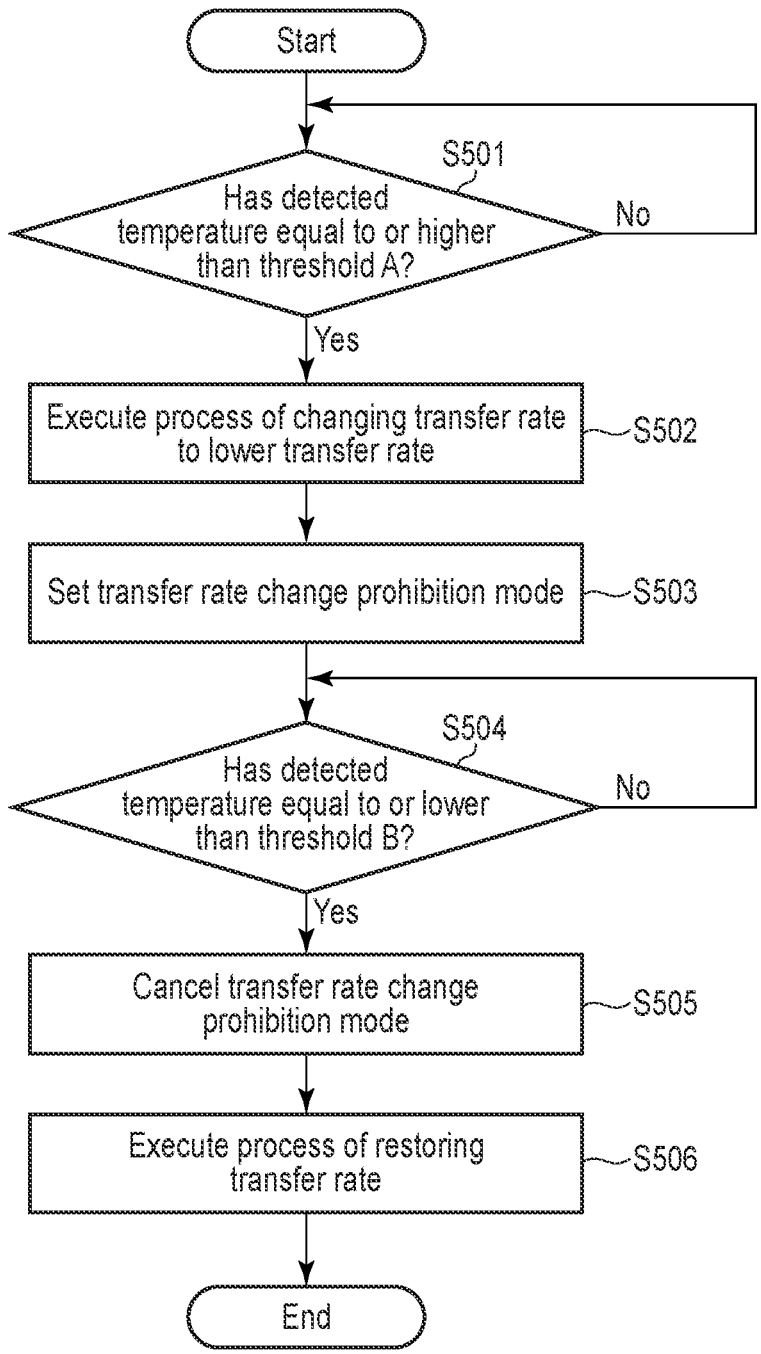
FIG. 9 is a flowchart illustrating a procedure of a transfer rate change process based on a temperature detected by a temperature sensor, the transfer rate change process being performed in the memory system according to the first embodiment.

Next, a procedure of a transfer rate change process based on an interrupt issued by the temperature sensor 55 will be described. FIG. 9 is a flowchart illustrating a procedure of a transfer rate change process based on a temperature detected by the temperature sensor 55, the transfer rate change process being performed in the UFS device 3 according to the first embodiment.

First, the controller 5 determines whether or not the temperature sensor 55 has detected a temperature equal to or higher than the threshold A (step S501). Specifically, the controller 5 determines whether or not an interrupt indicating that a temperature equal to or higher than the threshold A has been detected has been received from the temperature sensor 55.

In a case where the temperature sensor 55 has not detected a temperature equal to or higher than the threshold A (No in S501), the controller 5 waits until the temperature sensor 55 detects a temperature equal to or higher than the threshold A.

In a case where the temperature sensor 55 has detected a temperature equal to or higher than the threshold A (Yes in S501), the controller 5 performs a process of changing the transfer rate of the PHY 511 to a lower transfer rate in response to receiving the interrupt from the temperature sensor 55 (step S502). At this time, the controller 5 can store the transfer rate before the change in the internal memory 52. The lower transfer rate is, for example, a transfer rate lower than the current transfer rate of the PHY 511. In addition, the lower transfer rate may be the lowest transfer rate among the plurality of transfer rates supported by the PHY 511.

The controller 5 sets the transfer rate change prohibition mode (step S503). For example, the CPU 54 of the controller 5 sets the protocol control unit 512 to the transfer rate change prohibition mode by transmitting a transfer rate change prohibition request to the protocol control unit 512. When in the transfer rate change prohibition mode, the protocol control unit 512 prohibits the change of the transfer rate based on the transfer rate change request from the host 2.

Then, the controller 5 determines whether or not the temperature sensor 55 has detected a temperature equal to or lower than the threshold B (step S504).

In a case where the temperature sensor 55 has not detected a temperature equal to or lower than the threshold B (No in S504), the controller 5 waits until the temperature sensor 55 detects a temperature equal to or lower than the threshold B.

In a case where the temperature sensor 55 has detected a temperature equal to or lower than the threshold B (Yes in step S504), the controller 5 cancels the setting of the transfer rate change prohibition mode (step S505). Specifically, the protocol control unit 512 cancels the setting of the transfer rate change prohibition mode in response to receiving a request to cancel the transfer rate change prohibition mode from the CPU 54 of the controller 5.

Then, the controller 5 performs a process of restoring the transfer rate of the PHY 511 to the transfer rate before the change in S502 (step S506). For example, the controller 5 acquires the transfer rate before the change in S502 by reading the transfer rate from the internal memory 52.

As described above, in the UFS device 3 according to the first embodiment, an interrupt is transmitted to the CPU 54 when the temperature sensor 55 has detected a temperature equal to or higher than the threshold A. Upon receiving the interrupt, the CPU 54 requests the protocol control unit 512 to change the transfer rate of the PHY 511 to a transfer rate lower than the current transfer rate of the PHY 511. Upon receiving the request, the protocol control unit 512 changes the transfer rate of the PHY 511 to the transfer rate specified by the CPU 54.

As a result, the transfer rate of the PHY 511 can decrease, and the current value of the PHY 511 can decrease. As a result, heat generation of the UFS device 3 including the PHY 511 can be suppressed.

In addition, the higher the transfer rate of the PHY 511, the larger the current consumption value of the entire UFS device 3. The larger the current consumption value of the entire UFS device 3, the larger the amount of heat generation. Therefore, the higher the transfer rate of the PHY 511, the more effective the reduction of heat generation by lowering the transfer rate of the PHY 511.

Further, the protocol control unit 512 is set to the transfer rate change prohibition mode in which the change of the transfer rate of the PHY 511 based on the transfer rate change request of the host 2 is prohibited until the temperature sensor 55 detects a temperature equal to or lower than the threshold B after the transfer rate of the PHY 511 is changed to a transfer rate lower than the current transfer rate.

As a result, when the internal temperature of the controller 5 is high, the protocol control unit 512 can prevent the transfer rate of the PHY 511 from being set to a higher transfer rate again by the host 2 transmitting the transfer rate change request to the UFS device 3. That is, the protocol control unit 512 can maintain the transfer rate of the PHY 511 at a low transfer rate until the temperature of the UFS device 3 decreases to the normal temperature. Therefore, a state in which the heat generation of the UFS device 3 is suppressed is maintained when in the transfer rate change prohibition mode.

Second Embodiment

In the UFS device 3 according to the first embodiment, the temperature sensor 55 notifies the CPU 54 of an interrupt. Therefore, in a case where the CPU 54 cannot immediately perform an interrupt process, the start of the process of change of the transfer rate is delayed.

In addition, in the first embodiment, the transfer rate change prohibition mode of the protocol control unit 512 is set in response to the transfer rate change prohibition request issued by the CPU 54. Thus, when processing in the CPU 54 is delayed, a time lag can occur from when the process of changing the transfer rate to a lower transfer rate is performed according to the high temperature state of the UFS device 3 until the transfer rate change prohibition request is issued. When a transfer rate change request is issued from the host 2 during the time lag, the transfer rate of the PHY 511 is changed to a higher transfer rate because the protocol control unit 512 has not transitioned to the transfer rate change prohibition mode. In such a case, the controller 5 cannot maintain the transfer rate of the PHY 511 at a low transfer rate.

In a UFS device 3 according to a second embodiment, a temperature sensor 55 of a controller 5 notifies a protocol control unit 512 of an interrupt without a CPU 54.

A configuration and operation of an information processing system 1 including the UFS device 3 according to the second embodiment are substantially the same as the configuration and operation of the information processing system 1 including the UFS device 3 according to the first embodiment. Here, the UFS device 3 according to the second embodiment will be described focusing on a part different from the UFS device 3 according to the first embodiment.

FIG. 10 is a block diagram illustrating an internal configuration of a host I/F 51 of the UFS device 3 and an internal configuration of a device I/F 21 of a host 2 according to the second embodiment.

The protocol control unit 512 of the controller 5 in the UFS device 3 includes an abnormal temperature control unit 5121.

The abnormal temperature control unit 5121 is a control circuit. The abnormal temperature control unit 5121 issues a request to the protocol control unit 512 in response to the interrupt received from the temperature sensor 55. For example, the abnormal temperature control unit 5121 transmits a request to a circuit for generating a transfer rate change request or a transfer rate change request packet in the protocol control unit 512. The abnormal temperature control unit 5121 may issue a transfer rate change prohibition request.

Here, it is assumed that the temperature sensor 55 detects a temperature equal to or higher than a threshold A (also referred to as a first threshold). Upon detecting a temperature equal to or higher than the threshold A, the temperature sensor 55 transmits an interrupt (also referred to as a first notification) indicating that the measured temperature is equal to or higher than the threshold A to the abnormal temperature control unit 5121 of the protocol control unit 512. For example, the interrupt is transmitted using a signal line different from an internal bus 50.

Upon receiving the interrupt, the abnormal temperature control unit 5121 stores the current transfer rate (also referred to as a first transfer rate) of a PHY 511 in an internal memory 52. Then, the abnormal temperature control unit 5121 requests the protocol control unit 512 to change the transfer rate of the PHY 511 to a transfer rate lower than the current transfer rate of the PHY 511. For example, the abnormal temperature control unit 5121 requests a change of the transfer rate of the PHY 511 with specifying the lowest transfer rate among transfer rates supported by the PHY 511.

Upon receiving the request, the protocol control unit 512 determines whether or not to perform a transfer rate change process based on the request. Specifically, the protocol control unit 512 generates a transfer rate change request packet and transmits the generated transfer rate change request packet to the Tx 5114. The Tx 5114 transmits the transfer rate change request packet to the Rx 2113 through the bus 4.

The Rx 2113 transmits the received transfer rate change request packet to the protocol control unit 212. The protocol control unit 212 determines whether or not a PHY 211 supports the transfer rate specified by the received transfer rate change request packet, and generates a transfer rate change response packet including the determination result. The protocol control unit 212 transmits the generated transfer rate change response packet to the Tx 2114.

Then, the Rx 5113 receives the transfer rate change response packet for the transfer rate change request packet transmitted from the Tx 5114, from the Tx 2114 through the bus 4. The protocol control unit 512 receives the transfer rate change response packet for the transmitted transfer rate change request packet from the Rx 5113. Then, the protocol control unit 512 checks whether or not the transfer rate change response packet indicates that the change of the transfer rate is allowed. In a case where the transfer rate change response packet indicates that the change of the transfer rate is allowed, the protocol control unit 512 transmits a transfer rate change request to the PHY control circuit 5111 through the control bus.

Upon receiving the transfer rate change request, the PHY control circuit 5111 performs a process of changing the transfer rate of the PHY 511 based on the received transfer rate change request. When the process is completed, the PHY control circuit 5111 transmits a response indicating that the process is completed to the protocol control unit 512 through the control bus. Then, upon receiving the response, the protocol control unit 512 transmits a response indicating that the process is completed to the CPU 54 through the control bus, the data transmission/reception unit 513, and the internal bus 50.

At this time, the protocol control unit 512 transitions to a transfer rate change prohibition mode (also referred to as a first mode). While the transfer rate change prohibition mode is set, the protocol control unit 512 prohibits a change of the transfer rate of the PHY 511 based on the transfer rate change request received from the host 2. The protocol control unit 512 may transition to the transfer rate change prohibition mode in response to completion of the process of changing the transfer rate or a request issued by the abnormal temperature control unit 5121.

It is assumed that, thereafter, the temperature sensor 55 detects a temperature equal to or lower than the threshold B. Upon detecting a temperature equal to or lower than the threshold B (also referred to as a second threshold), the temperature sensor 55 transmits an interrupt (also referred to as a second notification) indicating that the measured temperature is equal to or lower than the threshold B to the abnormal temperature control unit 5121. The interrupt may also be transmitted using a signal line different from the internal bus 50.

Upon receiving the interrupt, the abnormal temperature control unit 5121 acquires the transfer rate (the first transfer rate) before the change stored in the internal memory 52. Then, the abnormal temperature control unit 5121 requests the protocol control unit 512 to cancel the setting of the transfer rate change prohibition mode.

Upon receiving the request, the protocol control unit 512 cancels the setting of the transfer rate change prohibition mode. The protocol control unit 512 may transmit, to the abnormal temperature control unit 5121, a response indicating that the process of canceling the setting of the transfer rate change prohibition mode is completed.

The abnormal temperature control unit 5121 requests the host I/F 51 to change the transfer rate of the PHY 511 to the first transfer rate.

Upon receiving the request, the protocol control unit 512 determines whether or not to perform the transfer rate change process based on the request in the PHY 511. Specifically, the protocol control unit 512 generates a transfer rate change request packet and transmits the generated transfer rate change request packet to the Tx 5114. The Tx 5114 transmits the transfer rate change request packet to the Rx 2113 through the bus 4. At this time, the protocol control unit 512 may add, as supplementary information, information indicating that the temperature of the controller 5 has returned to normal to the transfer rate change request packet. Accordingly, when transmitting the transfer rate change request packet, the protocol control unit 512 notifies the host 2 that the temperature of the controller 5 is the normal temperature.

The Rx 2113 transmits the received transfer rate change request packet to the protocol control unit 212. The protocol control unit 212 determines whether or not the PHY 211 supports the transfer rate specified by the received transfer rate change request packet, and generates a transfer rate change response packet. The protocol control unit 212 transmits the generated transfer rate change response packet to the Tx 2114.

Then, the Rx 5113 receives the transfer rate change response packet for the transfer rate change request packet transmitted from the Tx 5114, from the Tx 2114 through the bus 4. The protocol control unit 512 receives the transfer rate change response packet for the transmitted transfer rate change request packet from the Rx 5113. Then, the protocol control unit 512 checks whether or not the transfer rate change response packet indicates that the change of the transfer rate is allowed. In a case where the transfer rate change response packet indicates that the transfer rate can be changed, the protocol control unit 512 transmits a transfer rate change request to the PHY control circuit 5111 through the control bus.

The PHY control circuit 5111 performs the process of changing the transfer rate of the PHY 511 in response to the reception of the transfer rate change request. When the process is completed, the PHY control circuit 5111 transmits a response indicating that the process is completed to the protocol control unit 512 through the control bus. Then, upon receiving the response, the protocol control unit 512 transmits a response indicating that the process is completed to the CPU 54 through the control bus, the data transmission/reception unit 513, and the internal bus 50. Information indicating that the internal temperature of the controller 5 is normal may be added to this response as supplementary information.

As described above, in the UFS device 3 according to the second embodiment, the temperature sensor 55 transmits an interrupt indicating that a temperature equal to or higher than the first threshold has been detected or an interrupt indicating that a temperature equal to or lower than the second threshold has been detected to the protocol control unit 512. Then, upon receiving the interrupt, the protocol control unit 512 performs a process of changing the transfer rate of the PHY 511 according to the received interrupt.

As a result, the protocol control unit 512 can control the transfer rate of the PHY 511 based on the temperature detected by the temperature sensor 55 without the CPU 54. Therefore, the transfer rate change process can be started regardless of the state of the CPU 54.

In addition, the protocol control unit 512 can set the transfer rate change prohibition mode without requiring the transfer rate change prohibition request issued by the CPU 54. As a result, it is possible to reduce a time lag from when the transfer rate of the PHY 511 is changed to a lower transfer rate to when the transfer rate change prohibition mode is set.

Third Embodiment

Next, a UFS device 3 according to a third embodiment will be described. The UFS device 3 according to the third embodiment performs a process of decreasing a transfer rate of a PHY 511 in stages by using a plurality of low transfer rates.

Most of a configuration and operation of an information processing system 1 including the UFS device 3 according to the third embodiment are the same as the configuration and operation of the information processing system 1 including the UFS device 3 according to the first embodiment. Here, the UFS device 3 according to the third embodiment will be described focusing on a part different from the UFS device 3 according to the first embodiment.

In the first embodiment, two thresholds are used in such a way that the transfer rate of the PHY 511 is changed to a lower transfer rate when the temperature of the UFS device 3 is high. And the two thresholds are used in such a way that the transfer rate of the PHY 511 is restored to the transfer rate before the change when the temperature of the UFS device 3 returns to normal. As a result, the controller 5 controls the amount of heat generation of the PHY 511 based on the temperature of the UFS device 3.

However, in such control, when the UFS device 3 is in the high temperature state, the transfer rate of the PHY 511 rapidly decreases. That is, when the UFS device 3 is in the high temperature state, the processing capability of the UFS device 3 rapidly decreases.

On the other hand, in the UFS device 3 according to the third embodiment, three or more thresholds are used to set the transfer rate of the PHY 511 to one of three or more transfer rates. That is, a controller 5 further determines whether the temperature of the UFS device 3 is in a high temperature state by using a plurality of thresholds. In other words, the controller 5 further determines the stage of the high temperature state of the UFS device 3 by using the plurality of thresholds. Then, the transfer rate of the PHY 511 is changed to a different transfer rate according to the temperature in the high temperature state. As a result, the transfer rate of the PHY 511 can decrease in stages.

Hereinafter, a case where three thresholds are used will be described, but the number of thresholds used may be four or more. The three thresholds are a threshold A, a threshold B, and a threshold H. In addition, a case where transfer rates respectively corresponding to HS-G1, HS-G3, and HS-G5 are used as the three transfer rates will be described as an example.

Figure 11:
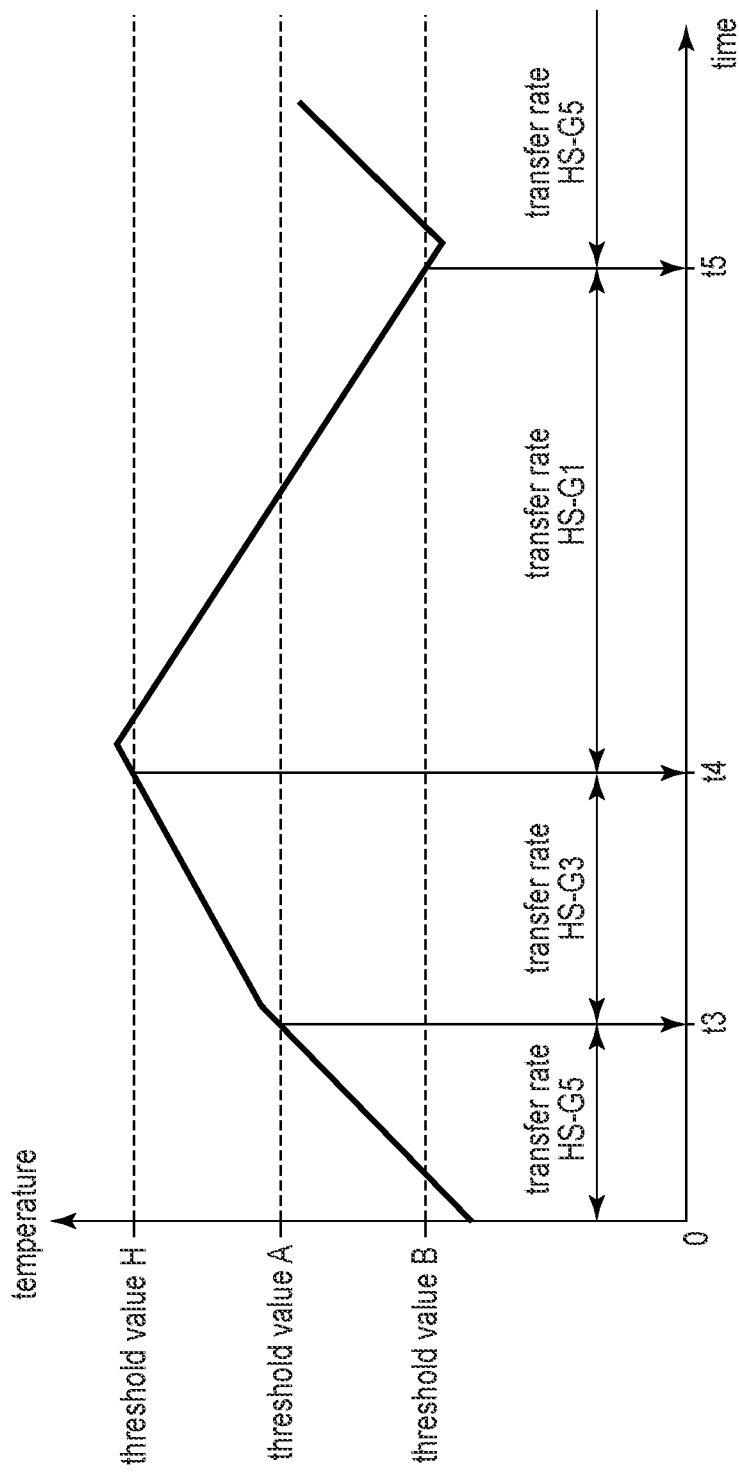
FIG. 11 is a diagram illustrating a temperature change and a set transfer rate in a memory system according to a third embodiment.

FIG. 11 is a diagram illustrating a temperature change and a set transfer rate in a memory system according to the third embodiment. Here, HS-G1, HS-G3, and HS-G5 are the same as the HS-Gs described with reference to FIG. 3 in the first embodiment.

In addition, the threshold B is the lowest value among the three thresholds. In a case where the temperature detected by the temperature sensor 55 is equal to or lower than the threshold B, the controller determines that the temperature of the UFS device 3, such as an internal temperature of the controller 5, is normal. In a case where the temperature detected by the temperature sensor 55 is equal to or higher than the threshold A or the threshold H, the controller 5 determines that the temperature of the UFS device 3 is high. The threshold H is a value higher than the threshold A. When the temperature sensor 55 detects a temperature equal to or higher than the threshold A, the controller 5 changes the transfer rate of the PHY 511 to a transfer rate lower than the current transfer rate. Then, the controller 5 changes the transfer rate of the PHY 511 to a lower transfer rate when the temperature sensor 55 detects a temperature equal to or higher than the threshold A and then further detects a temperature equal to or higher than the threshold H.

A vertical axis in FIG. 11 represents the temperature of the UFS device 3 measured by the temperature sensor 55. A horizontal axis in FIG. 11 represents time.

In an initial state (time 0), HS-G5 in which communication is performed at the highest transfer rate among the HS-Gs supported by the PHY 511 and the PHY 211 is set as the HS-G of the PHY 511.

While HS-G5 is set, the PHY 511 operates at a high current value, which leads to an increase in amount of heat generation. Therefore, the internal temperature of the controller 5 measured by the temperature sensor 55 gradually increases.

At time t3, the temperature sensor 55 detects that the internal temperature of the controller 5 becomes equal to or higher than the threshold A (also referred to as a first threshold). Then, the temperature sensor 55 transmits, to the CPU 54, an interrupt indicating that the internal temperature of the controller 5 is equal to or higher than the threshold A. Here, a case where the temperature sensor 55 transmits an interrupt to the CPU 54 similarly to the configuration of the UFS device 3 described in the first embodiment will be described as an example. However, the temperature sensor 55 may transmit an interrupt to an abnormal temperature control unit 5121 of a protocol control unit 512 similarly to the configuration of the UFS device 3 described in the second embodiment. Upon receiving the interrupt, the CPU 54 stores information indicating HS-G5 (also referred to as a first transfer rate) in an internal memory 52. Then, the CPU 54 transmits, to the protocol control unit 512, a transfer rate change request that specifies a mode corresponding to a transfer rate lower than a transfer rate corresponding to HS-G5. Here, the CPU 54 transmits a transfer rate change request that specifies HS-G3 (also referred to as a second transfer rate) to the protocol control unit 512. The protocol control unit 512 sets the PHY 511 to HS-G3 based on the received transfer rate change request.

Here, the protocol control unit 512 transitions to a transfer rate change prohibition mode (also referred to as a first mode) in which a process of changing the transfer rate of the PHY 511 to a transfer rate higher than the current transfer rate is prohibited. As a result, the protocol control unit 512 performs a transfer rate change process only when a transfer rate specified by a transfer rate change request received from a host 2 is lower than a transfer rate corresponding to HS-G3.

While HS-G3 is set, the PHY 511 operates at a lower current value than when HS-G5 is set. Therefore, the amount of heat generation decreases, and an increase in internal temperature of the controller 5 decreases. However, since the amount of heat generation of the entire controller 5 still exceeds a heat radiation amount of the controller 5, the internal temperature of the controller 5 gradually increases.

At time t4, the temperature sensor 55 detects that the internal temperature of the controller 5 becomes equal to or higher than the threshold H (also referred to as a third threshold). Then, the temperature sensor 55 transmits, to the CPU 54, an interrupt indicating that the internal temperature of the controller 5 is equal to or higher than the threshold H. Upon receiving the interrupt, the CPU 54 transmits a transfer rate change request that specifies a mode corresponding to a transfer rate lower than the transfer rate corresponding to HS-G3 to the protocol control unit 512. Here, as a HS-G specified by the CPU 54, for example, HS-G1 (also referred to as a third transfer rate) corresponding to the lowest transfer rate is selected among a plurality of HS-Gs supported by the PHY 511. The protocol control unit 512 sets the PHY 511 to HS-G1 based on the received transfer rate change request.

Here, the current transfer rate of the PHY 511 is changed to a transfer rate corresponding to HS-G1. As a result, in a case where the transfer rate specified by the transfer rate change request received from the host 2 is higher than the transfer rate corresponding to HS-G1, the protocol control unit 512 notifies the host 2 that the transfer rate change process cannot be performed.

While HS-G1 is set, the PHY 511 operates at a relatively low current value, which leads to a decrease in amount of heat generation. When the amount of heat generation of the entire controller 5 falls below the heat radiation amount of the controller 5, the internal temperature of the controller 5 gradually decreases.

At time t5, the temperature sensor 55 detects that the internal temperature of the controller 5 becomes equal to or lower than the threshold B. Then, the temperature sensor 55 transmits, to the CPU 54, an interrupt indicating that the internal temperature of the controller 5 is equal to or lower than the threshold B. Upon receiving the interrupt, the CPU 54 acquires information indicating HS-G5 which is the mode before the transfer rate is changed at time t3 from the internal memory 52. Then, the CPU 54 transmits, to the protocol control unit 512, a transfer rate change request that specifies HS-G5. That is, the CPU 54 issues the transfer rate change request in such a way that the HS-G before HS-G3 is set for the PHY 511 again. The protocol control unit 512 sets the PHY 511 to HS-G5 based on the received transfer rate change request.

Figure 12:
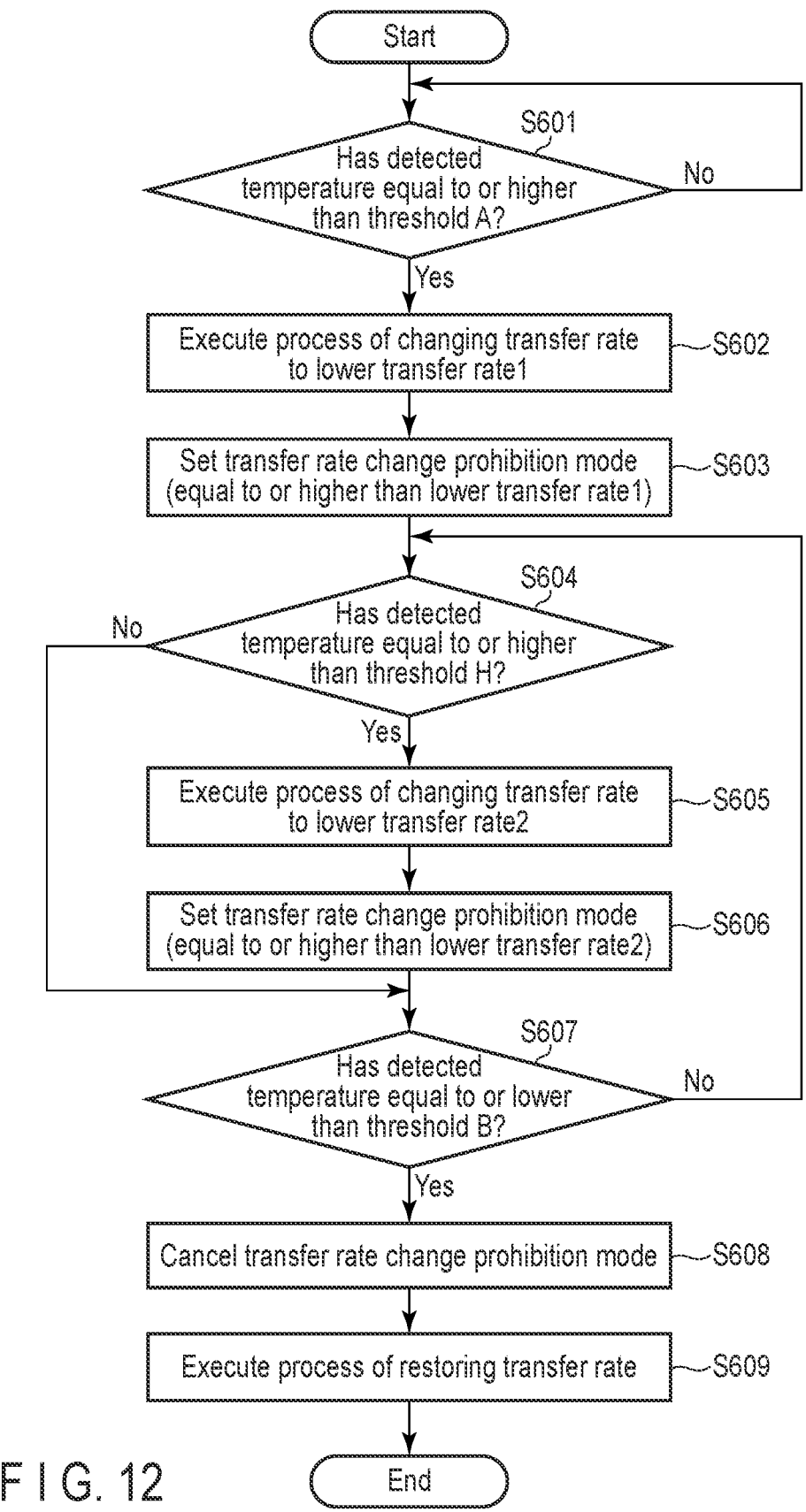
FIG. 12 is a flowchart illustrating a procedure of a transfer rate change process based on a temperature detected by a temperature sensor, the transfer rate change process being performed in the memory system according to the third embodiment.

Next, a procedure of a transfer rate change process based on an interrupt issued by the temperature sensor 55 in the UFS device 3 according to the third embodiment will be described. FIG. 12 is a flowchart illustrating a procedure of a transfer rate change process based on the temperature detected by the temperature sensor 55, the transfer rate change process being performed in the UFS device 3 according to the third embodiment.

First, the controller 5 determines whether or not the temperature sensor 55 has detected a temperature equal to or higher than the threshold A (step S601). Specifically, the controller 5 determines whether or not an interrupt indicating that a temperature equal to or higher than the threshold A has been detected has been received from the temperature sensor 55.

In a case where the temperature sensor 55 has not detected a temperature equal to or higher than the threshold A (No in S601), the controller 5 waits until the temperature sensor 55 detects a temperature equal to or higher than the threshold A.

In a case where the temperature sensor 55 has detected a temperature equal to or higher than the threshold A (Yes in S601), the controller 5 performs a process of changing the transfer rate of the PHY 511 to a lower transfer rate 1 in response to receiving of the interrupt from the temperature sensor 55 (step S602). At this time, the controller 5 stores the transfer rate before the change in the internal memory 52. The lower transfer rate 1 is a transfer rate lower than the current transfer rate of the PHY 511. The lower transfer rate 1 is, for example, the transfer rate corresponding to HS-G3.

The controller 5 sets the transfer rate change prohibition mode (the lower transfer rate 1 or higher) (step S603). For example, the CPU 54 of the controller 5 sets the protocol control unit 512 to the transfer rate change prohibition mode by transmitting a transfer rate change prohibition request to the protocol control unit 512. When in the transfer rate change prohibition mode, the controller 5 (or the protocol control unit 512) prohibits a change to a transfer rate higher than the lower transfer rate 1 based on the transfer rate change request received from the host 2.

Then, the controller 5 determines whether or not the temperature sensor 55 has detected a temperature equal to or higher than the threshold H (step S604).

In a case where the temperature sensor 55 has detected a temperature equal to or higher than the threshold H (Yes in S604), the controller 5 performs a process of changing the transfer rate to a lower transfer rate 2 (step S605). The lower transfer rate 2 is a transfer rate lower than the lower transfer rate 1. The lower transfer rate 2 is, for example, the lowest transfer rate among the transfer rates supported by the PHY 511. For example, the lower transfer rate 2 is the transfer rate corresponding to HS-G1.

The controller 5 sets the transfer rate change prohibition mode (the lower transfer rate 2 or higher) (step S606). When in the transfer rate change prohibition mode, the controller 5 (or the protocol control unit 512) prohibits a change to a transfer rate higher than the lower transfer rate 2 based on the transfer rate change request received from the host 2.

In a case where the temperature sensor 55 has not detected a temperature equal to or higher than the threshold H (No in S604), the controller 5 skips the processes of S605 and S606.

Then, the controller 5 determines whether or not the temperature sensor 55 has detected a temperature equal to or lower than the threshold B (step S607).

In a case where the temperature sensor 55 has not detected a temperature equal to or lower than the threshold B (No in S607), the controller 5 returns to S604 and determines whether or not the temperature sensor 55 has detected a temperature equal to or higher than the threshold H. In addition, in a case where affirmative determination (Yes) is made in S604, and negative determination (No) is made in S607 through the processes of S605 and S606, the transfer rate of the PHY 511 is already set to the lower transfer rate 2, and thus the controller 5 may wait until the temperature sensor 55 detects a temperature equal to or lower than the threshold B.

In a case where the temperature sensor 55 has detected a temperature equal to or lower than the threshold B (Yes in step S607), the controller 5 cancels the setting of the transfer rate change prohibition mode (step S608). Specifically, the protocol control unit 512 cancels the setting of the transfer rate change prohibition mode in a case where the CPU 54 of the controller 5 transmits a request to cancel the transfer rate change prohibition mode to the protocol control unit 512.

Then, the controller 5 performs a process of restoring the transfer rate of the PHY 511 to the transfer rate before the change in S602 (step S609). For example, the controller 5 acquires the transfer rate before the change in S602 by reading the transfer rate from the internal memory 52.

As described above, in the UFS device 3 according to the third embodiment, the transfer rate of the PHY 511 can decrease in stages by using the threshold A and the threshold H higher than the threshold A in order to determine whether or not the internal temperature of the controller 5 is high.

As a result, it is possible to avoid rapid deterioration in processing performance of the UFS device 3 due to a rapid decrease in transfer rate of the PHY 511 in a case where the temperature sensor 55 has detected a temperature equal to or higher than the threshold.

Fourth Embodiment

A UFS device 3 according to a fourth embodiment uses a transfer rate specified in advance by a host 2 as a transfer rate (a lower transfer rate, or also referred to as a second transfer rate) specified by a transfer rate change request issued by a CPU 54.

Most of a configuration and operation of an information processing system 1 including the UFS device 3 according to the fourth embodiment are the same as the configuration and operation of the information processing system 1 including the UFS device 3 according to the first embodiment. Here, the UFS device 3 according to the fourth embodiment will be described focusing on a part different from the UFS device 3 according to the first embodiment.

In this case, a procedure in which the lower transfer rate is specified by the host 2 will be described. FIG. 13 is a sequence diagram illustrating a procedure of a lower transfer rate setting process performed in the information processing system 1 including the UFS device 3 according to the fourth embodiment.

The lower transfer rate setting process may be performed, for example, when the host 2 and the UFS device 3 are connected.

First, the host 2 transmits, to the UFS device 3, a request that specifies the lower transfer rate (step S701). The request specifies any one of transfer rates supported by a PHY 211 of the host 2. Similarly to the UFS device 3 according to the third embodiment, when the UFS device 3 is configured to decrease the transfer rate in stages, the host 2 can transmit a request that specifies a plurality of transfer rates.

Upon receiving a request in S701, the UFS device 3 stores a transfer rate specified by the received request in an internal memory 52 (step S702).

Then, the UFS device 3 transmits, to the host 2, a notification indicating that a process corresponding to the request received in S701 is completed (step S703).

As a result, the UFS device 3 stores the transfer rate specified by the host 2 as the lower transfer rate in the internal memory 52. Then, a controller 5 of the UFS device 3 acquires the lower transfer rate from the internal memory 52 when a temperature sensor 55 detects a temperature equal to or higher than a threshold A. Then, the controller 5 requests a protocol control unit 512 to change a transfer rate of a PHY 511 to the acquired lower transfer rate.

In addition, the host 2 may read, from the UFS device 3, a transfer rate desirable as the lower transfer rate for the UFS device 3, before transmitting the request that specifies the lower transfer rate. In other words, the UFS device 3 may notify the host 2 of a transfer rate recommended as the lower transfer rate. A lower transfer rate setting process in this case will be described. FIG. 14 is a sequence diagram illustrating a procedure of a recommended lower transfer rate notification process and a lower transfer rate setting process performed in the information processing system 1 including the UFS device 3 according to the fourth embodiment.

The recommended lower transfer rate notification process and the lower transfer rate setting process can be performed, for example, when the host 2 and the UFS device 3 are connected.

The host 2 transmits a request for reading a recommended lower transfer rate to the UFS device 3 (step S801).

Upon receiving the request in S801, the UFS device 3 transmits the recommended lower transfer rate to the host 2 (step S802). For example, the UFS device 3 transmits, to the host 2, the lowest transfer rate among the transfer rates supported by the PHY 511 of the UFS device 3 as the recommended lower transfer rate.

The host 2 transmits, to the UFS device 3, a request that specifies the recommended lower transfer rate received in S802 as the lower transfer rate (step S803).

Upon receiving the request in S803, the UFS device 3 stores the transfer rate specified by the received request in the internal memory 52 (step S804).

Then, the UFS device 3 transmits, to the host 2, a notification indicating that a process corresponding to the request received in S803 is completed (step S805).

In this manner, the UFS device 3 can notify the host 2 of a transfer rate desirable as the lower transfer rate. The transfer rate desirable as the lower transfer rate is, for example, a transfer rate that can sufficiently suppress heat generation of the controller 5 when set as the transfer rate of the PHY 511.

As described above, when the temperature sensor 55 has detected a temperature equal to or higher than the threshold A, the controller of the UFS device 3 according to the fourth embodiment transmits, to the protocol control unit 512, a request to change the current transfer rate to the lower transfer rate specified by the host 2.

As a result, the UFS device 3 can avoid setting the transfer rate of the PHY 511 to a transfer rate lower than the minimum transfer rate to be guaranteed for the host 2.

In addition, the controller 5 of the UFS device 3 notifies the host 2 of the recommended lower transfer rate, before the lower transfer rate is specified by the host 2.

As a result, the controller 5 of the UFS device 3 can prevent a transfer rate that cannot sufficiently suppress the heat generation in the controller 5 when set as the transfer rate of the PHY 511 from being specified as the lower transfer rate by the host 2.

In addition, in step S702 illustrated in FIG. 13 and step S804 illustrated in FIG. 14, the controller 5 may store the transfer rate specified by the request from the host 2 not only in the internal memory 52 but also in a NAND memory 6. As a result, even when the UFS device 3 is powered off and data in the internal memory 52 is lost, the controller 5 can read the transfer rate specified by the host 2 from the NAND memory 6. Therefore, the UFS device 3 can use the transfer rate specified by the host 2 even after recovery from power off as long as the UFS device 3 receives a request to specify the transfer rate from the host 2 once.

Note that the thresholds and the transfer rates used in the first to fourth embodiments are not limited to preset values. Each setting value may be changed as necessary.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
a nonvolatile memory;
a controller electrically connected to the nonvolatile memory and configured to control writing of data to the nonvolatile memory and reading of data from the nonvolatile memory; and
a temperature sensor, wherein
the controller includes a host interface circuit including a physical layer that performs communication with the host, and a protocol control circuit that determines a transfer rate between the physical layer and the host, and
the protocol control circuit is configured to:
when a temperature detected by the temperature sensor becomes equal to or higher than a first threshold,
change the transfer rate from a first transfer rate to a second transfer rate that is lower than the first transfer rate; and
transition to a first mode in which a change of the transfer rate based on a first request from the host is prohibited.

2. The memory system according to claim 1, wherein
the controller further includes a volatile memory,
the controller is configured to store the first transfer rate in the volatile memory when the temperature detected by the temperature sensor becomes equal to or higher than the first threshold, and
the protocol control circuit is configured to:
when the temperature detected by the temperature sensor becomes equal to or lower than a second threshold that is lower than the first threshold,
cancel the first mode; and
perform a process of restoring the transfer rate to the first transfer rate stored in the volatile memory.

3. The memory system according to claim 1, wherein
the protocol control circuit is configured to:
when changing the transfer rate to the second transfer rate,
notify the host of the first request indicating that the transfer rate is to be changed to the second transfer rate and information indicating that the memory system is in a high temperature state.

4. The memory system according to claim 1, wherein
the protocol control circuit is configured to:
in response to receiving the first request from the host,
determine whether or not the protocol control circuit is in the first mode; and
in a case where the protocol control circuit is in the first mode, transmit, as a response to the first request, a response indicating that the transfer rate is not allowed to change due to a high temperature state, to the host.

5. The memory system according to claim 1, wherein the protocol control circuit is configured to:
in response to receiving the first request from the host in a state in which the protocol control circuit is in the first mode,
compare a transfer rate that is specified by the first request from the host with the second transfer rate, and
only when the specified transfer rate is lower than the second transfer rate, change the transfer rate to the specified transfer rate.

6. The memory system according to claim 1, wherein the protocol control circuit is configured to:
when the temperature detected by the temperature sensor becomes equal to or higher than a third threshold that is higher than the first threshold, change the transfer rate to a third transfer rate that is lower than the second transfer rate.

7. The memory system according to claim 1, wherein the controller further includes a processor,
the temperature sensor is configured to transmit a first notification to the processor in a case where the detected temperature is equal to or higher than the first threshold,
the processor is configured to:
in response to receiving the first notification from the temperature sensor,
transmit, to the protocol control circuit, a second request for requesting to change the transfer rate to the second transfer rate; and
set the protocol control circuit to the first mode, and
the protocol control circuit is configured to:
change the transfer rate of the physical layer to the second transfer rate, based on the second request; and
prohibit the change of the transfer rate based on the first request while the protocol control circuit is in the first mode.

8. The memory system according to claim 7, wherein the controller further includes a volatile memory,
the processor is configured to further perform a process of storing the first transfer rate in the volatile memory in response to receiving the first notification from the temperature sensor,
the temperature sensor is configured to transmit a second notification to the processor when the detected temperature becomes equal to or lower than a second threshold that is lower than the first threshold,
the processor is configured to:
in response to receiving the second notification from the temperature sensor,
cancel setting of the first mode for the protocol control circuit; and
request the protocol control circuit to restore the transfer rate of the physical layer to the first transfer rate stored in the volatile memory, and
the protocol control circuit is configured to:
restore the transfer rate of the physical layer to the first transfer rate.

9. The memory system according to claim 1, wherein the temperature sensor is configured to transmit a first notification to the protocol control circuit in a case where the detected temperature is equal to or higher than the first threshold, and the protocol control circuit is configured to:
in response to receiving the first notification from the temperature sensor,
change the transfer rate to the second transfer rate; and
transition to the first mode.

10. The memory system according to claim 9, wherein the controller further includes a volatile memory,
the protocol control circuit is configured to store the first transfer rate in the volatile memory in response to receiving the first notification from the temperature sensor,
the temperature sensor is configured to transmit a second notification to the protocol control circuit when the detected temperature becomes equal to or lower than a second threshold that is lower than the first threshold, and
the protocol control circuit is configured to:
in response to receiving the second notification from the temperature sensor,
cancel the first mode; and
restore the transfer rate to the first transfer rate stored in the volatile memory.

11. The memory system according to claim 1, wherein the controller is configured to:
select a transfer rate specified in advance by the host as the second transfer rate.

12. The memory system according to claim 1, wherein the controller is configured to:
notify the host of a recommended transfer rate that is capable of suppressing an increasing of temperature of the memory system.

13. The memory system according to claim 1, wherein communication between the host and the memory system is performed in an initiator-target model.

14. A method of controlling communication between a host and a memory system, the method comprising:
determining a transfer rate between a physical layer of the memory system and the host;
detecting a temperature of the memory system;
determining that the detected temperature is equal to or higher than a first threshold;
in response to determining that the detected temperature is equal to or higher than the first threshold,
changing the transfer rate from a first transfer rate to a second transfer rate that is lower than the first transfer rate; and
prohibiting a change of the transfer rate based on a first request from the host.

15. The method according to claim 14, wherein the memory system further includes a volatile memory, and
the method further comprises:
in response to determining that the detected temperature is equal to or higher than the first threshold, storing the first transfer rate in the volatile memory;
determining that the detected temperature is equal to or lower than a second threshold that is lower than the first threshold;
in response to determining that the detected temperature is lower than the second threshold,
permitting a change of the transfer rate based on a first request from the host; and
performing a process of restoring the transfer rate to the first transfer rate stored in the volatile memory.

16. The method according to claim 14, further comprising in response to changing the transfer rate to the second transfer rate, notifying the host of the first request indicating that the transfer rate is to be changed to the second transfer rate and information indicating that the memory system is in a high temperature state.

17. The method according to claim 14, further comprising:
in response to receiving the first request from the host, determining that the detected temperature is equal to or higher than the first threshold; and
in response to determining that the detected temperature is equal to or higher than the first threshold, transmitting, as a response to the first request, a response indicating that the transfer rate is not allowed to change due to a high temperature state, to the host.

18. The method according to claim 14, further comprising:
in response to receiving the first request from the host in a state in which the detected temperature is equal to or higher than the first threshold,
comparing a transfer rate that is specified by the first request from the host with the second transfer rate;
determining the specified transfer rate is lower than the second transfer rate; and
only in response to determining the specified transfer rate is lower than the second transfer rate, changing the transfer rate to the specified transfer rate.

19. The method according to claim 14, further comprising:
determining that the detected temperature is equal to or higher than a third threshold that is higher than the first threshold; and
in response to determining that the detected temperature is equal to or higher than the third threshold, changing the transfer rate to a third transfer rate that is lower than the second transfer rate.

20. A memory system connectable to a host, comprising:
a nonvolatile memory;
a controller electrically connected to the nonvolatile memory and configured to control writing of data to the nonvolatile memory and reading of data from the nonvolatile memory; and
a temperature sensor, wherein
the controller includes:
a host interface circuit including a physical layer that performs communication with the host; and
control means for determining a transfer rate between the physical layer and the host,
the control means further including:
means for changing the transfer rate from a first transfer rate to a second transfer rate that is lower than the first transfer rate when a temperature detected by the temperature sensor becomes equal to or higher than a first threshold; and
means for transitioning to a first mode in which a change of the transfer rate based on a first request from the host is prohibited when the temperature detected by the temperature sensor becomes equal to or higher than the first threshold.

* * * * *